United States Patent
Chang et al.

(10) Patent No.: US 10,289,654 B2
(45) Date of Patent: May 14, 2019

(54) SMART VARIABLE EXPRESSIVE TEXT OR GRAPHICS FOR ELECTRONIC COMMUNICATIONS

(71) Applicant: Google LLC, Mountain View, CA (US)

(72) Inventors: Mark Chang, Seattle, WA (US); Joy Barlow, Mountain View, CA (US); Anton Volkov, San Francisco, CA (US); Matthew Austin, Palo Alto, CA (US); James Buyayo, San Francisco, CA (US); Jason Cornwell, Menlo Park, CA (US); Debbie Kim, Kirkland, WA (US); Richard Lo, Fremont, CA (US); Johnathon Schlemmer, San Ramon, CA (US); Christopher Tompkins, Mountain View, CA (US); Megan Torkildson, Mountain View, CA (US)

(73) Assignee: Google LLC, Mountain View, CA (US)

( * ) Notice: Subject to any disclaimer, the term of this patent is extended or adjusted under 35 U.S.C. 154(b) by 362 days.

(21) Appl. No.: 15/156,290

(22) Filed: May 16, 2016

(65) Prior Publication Data
US 2017/0286366 A1   Oct. 5, 2017

Related U.S. Application Data

(60) Provisional application No. 62/316,154, filed on Mar. 31, 2016.

(51) Int. Cl.
*G06F 3/0484* (2013.01)
*G06F 17/21* (2006.01)
(Continued)

(52) U.S. Cl.
CPC ........ *G06F 17/211* (2013.01); *G06F 3/04845* (2013.01); *G06F 3/04847* (2013.01);
(Continued)

(58) Field of Classification Search
CPC .......... G06F 3/00; G06F 3/048; G06F 3/0481; G06F 3/082; G06F 3/0484;
(Continued)

(56) References Cited

U.S. PATENT DOCUMENTS

| | | |
|---|---|---|
| D388,774 S | 1/1998 | Giuntoli |
| D390,214 S | 2/1998 | Miller |

(Continued)

FOREIGN PATENT DOCUMENTS

EP    2787429    10/2014

OTHER PUBLICATIONS

International Search Report and Written Opinion for PCT/US2016/065427, dated Mar. 21, 2017, 13 pgs.

(Continued)

*Primary Examiner* — Xiomara L Bautista
(74) *Attorney, Agent, or Firm* — IP Spring

(57) ABSTRACT

A system and method for creating, sending, receiving, or displaying messages with smart variable expressive text or graphics is described. The method includes providing a user interface for inputting content and specifying an appearance of the content, receiving the content and an appearance control input via the user interface, responsive to the appearance control input, creating a message including the content and formatting information, and sending the message including the content and the formatting information.

27 Claims, 29 Drawing Sheets

(51) Int. Cl.
  *G06F 17/24* (2006.01)
  *G06T 11/60* (2006.01)
  *G06T 13/80* (2011.01)
  *G06F 17/27* (2006.01)
  *H04L 12/58* (2006.01)
  *H04W 4/14* (2009.01)
  *H04M 1/725* (2006.01)
  *G06F 3/0488* (2013.01)

(52) U.S. Cl.
  CPC ........ *G06F 3/04883* (2013.01); *G06F 17/214* (2013.01); *G06F 17/24* (2013.01); *G06F 17/27* (2013.01); *G06T 11/60* (2013.01); *G06T 13/80* (2013.01); *H04L 51/046* (2013.01); *H04L 51/10* (2013.01); *H04L 51/38* (2013.01); *H04M 1/72552* (2013.01); *H04W 4/14* (2013.01); *G06F 2203/04806* (2013.01)

(58) Field of Classification Search
  CPC ............. G06F 3/04845; G06F 3/04847; G06F 3/04806; G06F 3/04883; G06F 17/21; G06F 17/214; G06F 17/24; G06F 17/27; H04L 12/58; H04L 51/04; H04L 51/046; H04L 51/10; H04M 1/715; H04M 1/72552
  See application file for complete search history.

(56) References Cited

U.S. PATENT DOCUMENTS

| | | |
|---|---|---|
| D395,291 S | 6/1998 | Mason et al. |
| D478,912 S | 8/2003 | Johnson |
| 6,678,891 B1 | 1/2004 | Wilcox et al. |
| D523,442 S | 6/2006 | Hiramatsu |
| D526,657 S | 8/2006 | Matsumoto |
| D526,658 S | 8/2006 | Matsumoto |
| D526,659 S | 8/2006 | Matsumoto |
| 7,240,025 B2* | 7/2007 | Stone .................... G06Q 10/00 705/14.1 |
| D653,673 S | 2/2012 | Bechtold et al. |
| D695,306 S | 12/2013 | Gabouer et al. |
| D705,805 S | 5/2014 | Schweizer |
| D786,906 S | 5/2017 | Andersen et al. |
| D786,917 S | 5/2017 | Hong et al. |
| 9,864,496 B2* | 1/2018 | Choi .................... H04L 12/1895 |
| 9,961,386 B1* | 5/2018 | Thomas ........... H04N 21/26258 |
| 2008/0014982 A1* | 1/2008 | Foxenland ........... G06Q 10/107 455/550.1 |
| 2011/0106662 A1* | 5/2011 | Stinchcomb ........... G06Q 30/06 705/26.43 |
| 2014/0156762 A1 | 6/2014 | Yuen et al. |
| 2014/0310627 A1* | 10/2014 | Kim .................... G06F 3/04886 715/773 |
| 2015/0082189 A1* | 3/2015 | Baer .................... G06F 3/04842 715/752 |
| 2015/0268826 A1* | 9/2015 | Langholz ............ G06F 3/04845 715/752 |
| 2016/0070468 A1* | 3/2016 | Alfut .................... G06F 3/04886 715/773 |

OTHER PUBLICATIONS

"Samsung Galaxy S5: Flow to Change Text Message Font Size" Jun. 2, 2014, YouTube, site visited Dec. 19, 2017, https://www.youtube.com/watch?v=0D-sQJLNK2M.

Hauk, "How to Change the Font Size of Messages in iOS 6" Jul. 13, 2013, MacTrast, retrieved Dec. 19, 2017 http://www.mactrast.com/20 13/07/how-to-change-the-font -size-of-messages-on-an-ios-6-device/.

"How to Change Font Size on Android," Nov. 28, 2017, The Android Soul, retrieved on Jan. 23, 2018, from https://www.theandroidsoul.com/change-font-size-android/.

"Change the Font Size of Messages on the iPhone to be More Readable," Jul. 5, 2013, OSX Daily, retrieved on Jan. 23, 2018, from http://osxdaily.com/2013/07/05/change-font-size-messages-iphone/.

* cited by examiner

SMART VARIABLE EXPRESSIVE TEXT OR GRAPHICS FOR ELECTRONIC COMMUNICATIONS

CROSS-REFERENCE TO RELATED APPLICATIONS

This is application claims the benefit under 35 U.S.C. § 119(e) of U.S. Patent Application No. 62/316,154, entitled "Smart Variable Expressive Text and Graphics for Electronic Communications" filed Mar. 31, 2016, the contents of which are all incorporated by reference herein.

BACKGROUND

In recent years, there has been widespread adoption and use of smart phones and mobile phones for communication. There are a number of applications that operate on these devices including communications applications. More specifically, these devices allow communication by voice as well as various types of messaging. However, users struggle to communicate clearly, effectively, and with desired nuance and tone when they use digitally-mediated mechanisms such as mobile messaging.

There have been attempts to solve this problem by providing a small digital image, symbol, or icon (emoji) to express an emotion or an idea. There are numerous different emojis available; however, the range of expressiveness using them continues to be limited. Even using these emojis in electronic communication, digital communications are still inadequate for communicating desired nuance and tone. Further, as the number of emojis has greatly increased, they are difficult to identify, select and add to messages making them less effective in communications.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

This specification relates to systems and methods for creating, sending, receiving, or displaying messages with smart variable expressive text or graphics. According to one aspect of the subject matter described in this disclosure, a system includes a processor, and a memory storing instructions that, when executed, cause the system to perform operations comprising: providing a user interface for inputting content and specifying an appearance of the content, receiving the content and an appearance control input via the user interface, responsive to the appearance control input, creating a message including the content and formatting information, and sending the message including the content and the formatting information.

In general, another aspect of the subject matter described in this disclosure includes a method that includes providing a user interface for inputting content and specifying an appearance of the content, receiving the content and an appearance control input via the user interface, responsive to the appearance control input, creating a message including the content and formatting information, and sending the message including the content and the formatting information.

Other implementations of one or more of these aspects include corresponding systems, apparatus, and computer programs, configured to perform the actions of the methods, encoded on computer storage devices.

These and other implementations may each optionally include one or more of the following features. For instance, the user interface may include an expressiveness control indicator for specifying the appearance of the content, the expressiveness control indicator movable in the user interface to vary the appearance of the content; the user interface may include a slider bar and an indicator that allows a user to control expressiveness of the appearance of the content along a range of values corresponding to positions of the indicator on the slider bar; the user interface may include a visual cue indicating an amount of expressiveness that will be added to the appearance of the content based on a position of the indicator on the slider bar, the visual cue positioned proximate an end of the slider bar; or the formatting information may be a visual effect.

In general, another aspect of the subject matter of this disclosure may be embodied in methods that include modifying the appearance of the content responsive to the appearance control input; and updating the user interface to include the content with the modified appearance based on the appearance control input. In another instance, the operations may include determining whether the appearance control input satisfies a threshold; responsive to the appearance control input satisfying the threshold, replacing the content with a substitute message. For instance, the substitute message may include a graphic and animation. In another instance, the operations may further include determining a context for the content; and selecting the substitute message and an appearance of the substitute message based on the determined context.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

As noted above, one technical issue with digitally-mediated mechanisms such as mobile messaging is that there is no way to communicate with the desired nuance and tone. In particular for text messaging, there is no way to vary the expressiveness of the communication because messaging is limited to text. Another technical issue is providing an easy to use way for a user to vary the amount of expressiveness in messages and provide the user with feedback as to how much expressiveness is added and how the message will appear to the recipient of the message. This is particularly a technical challenge for mobile computing devices like smart phones where the screen space and the input devices and methods are limited. The systems and methods disclosed in this specification solve these technical issues by providing a messaging application for generating, sending, receiving or viewing messages with smart variable expressive text or graphics. The systems and methods also provide a user interface that is intuitive and provides the user with control over how much expressiveness is added to the text or graphics. In some implementations, the user interface provides an appearance control mechanism in the form of a slider bar and an indicator that the user can manipulate to vary the expressiveness of input content (text). The user interface advantageously modifies the appearance of the content in response to movement of the indicator so the user is able to preview the appearance of the message before it is sent. The systems and methods disclosed in this specification are advantageous because they allow users to communicate clearly and effectively by modifying content to add different levels of expressiveness. The systems and methods disclosed in this specification are also advantageous because, in some implementations, the messaging application will auto generate a surprise or substitute message based on the context of the user, context of the communication, context of the device or any one or more of these contexts.

Figure 1:
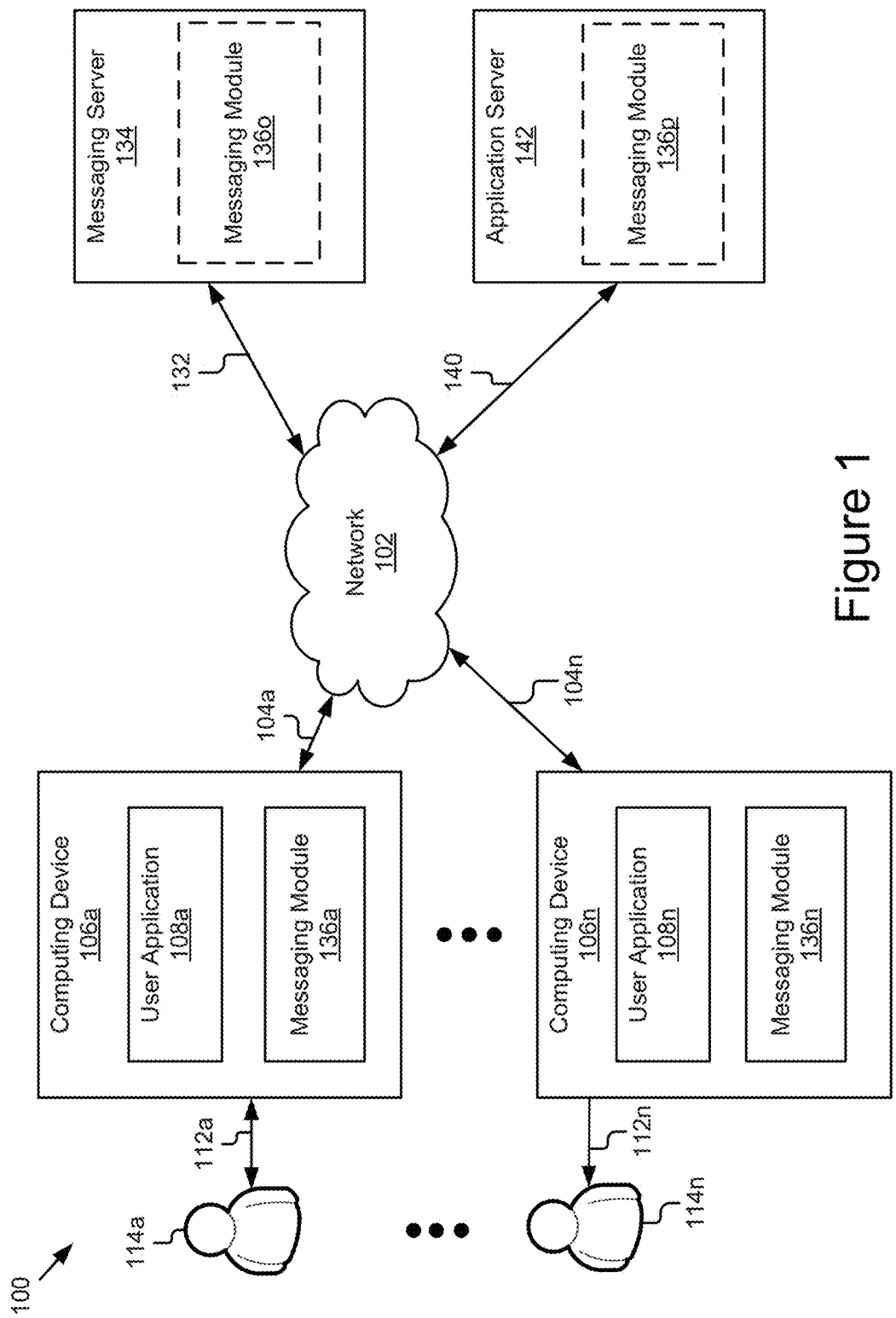
FIG. 1 is a block diagram of an example system for creating, sending, receiving or displaying messages with smart variable expressive text or graphics.

FIG. 1 illustrates a block diagram of an example system 100 for generating, sending, receiving or viewing messages with smart variable expressive text or graphics using computing devices 106. The system 100 comprises a plurality of computing devices 106a-106n, a network 102, a messaging server 134 and an application server 142. The system 100 as illustrated has user (or client) computing devices 106a through 106n typically utilized by users 114a through 114n to access servers hosting applications, websites or services via a network 102. The system 100 may include the messaging server 134 and the application server 142 by way of example. In the illustrated example, these entities are communicatively coupled via the network 102.

It should be recognized that in FIG. 1 as well as other figures used to illustrate the invention, an indication of a letter after a reference number or numeral, for example, "106a" is a specific reference to the element or component that is designated by that particular reference numeral. In the event a reference numeral appears in the text without a letter following it, for example, "106," it should be recognized that such is a general reference to different implementations of the element or component bearing that general reference numeral.

The network 102 may be a conventional type, wired or wireless, and may have numerous different configurations including a star configuration, token ring configuration or other configurations. Furthermore, the network 102 may include a local area network (LAN), a wide area network (WAN) (e.g., the Internet), and/or other interconnected data paths across which multiple devices may communicate. In some implementations, the network 102 may be a peer-to-peer network. The network 102 may also be coupled to or includes portions of a telecommunications network for sending data in a variety of different communication protocols. In some other implementations, the network 102 includes Bluetooth communication networks or a cellular communications network for sending and receiving data including via short messaging service (SMS), multimedia messaging service (MMS), hypertext transfer protocol (HTTP), direct data connection, wireless access protocol (WAP), email, etc. In addition, although FIG. 1 illustrates a single network 102 coupled to the computing devices 106 and the servers 134, 142 in practice one or more networks 102 may be connected to these entities.

The computing devices 106a through 106n in FIG. 1 are used by way of example. Although only two computing devices 106 are illustrated, the disclosure applies to a system architecture having any number of computing devices 106 available to any number of users 114. In the illustrated implementation, the users 114a through 114n interact with the computing device 106a and 106n, via signal lines 112a through 112n, respectively. The computing devices 106a through 106n are communicatively coupled to the network 102 via signal lines 104a through 104n respectively.

In some implementations, the computing device 106 (any or all of 106a through 106n) can be any computing device that includes a memory and a processor, as described in more detail below with reference to FIG. 2. For example, the computing device 106 can be a laptop computer, a desktop computer, a tablet computer, a mobile telephone, a smart phone, a personal digital assistant, a mobile email device, a portable game player, a portable music player, a television with one or more processors embedded therein or coupled thereto or any other electronic device capable of accessing the network 102, etc.

In some implementations, the computing devices 106a through 106n comprise a user application 108 (illustrated as 108a through 108n) and a messaging module 136 (illustrated as 136a through 136n). The user 114 (114a through 114n) uses the user application 108 to exchange information with the messaging module 136, the messaging server 134, and the application server 142, as appropriate to accomplish the operations of the present invention. As one example, the user 114 may have a several applications 108 operational on the computing device 106 that receive and send messages about status and a variety of other conditions to and from the messaging server 134 and the application server 142. For example, such applications may include social networking applications, messaging applications, photo sharing applications, video conferencing applications, etc. The processing of messages for those applications 108 are handled by the messaging module 136 as will be described in more detail below with reference to FIG. 2. In some implementations, the messaging module 136 is an application itself providing enhanced messaging capabilities.

The messaging server 134 may be a computing device that includes a processor, a memory and network communication capabilities. The messaging server 134 is coupled to the network 102, via a signal line 132. The messaging server 134 may be configured to send messages to the computing devices 106 (106a through 106n), via the network 102. The messaging server 134 may also be configured to receive status and other information from the computing devices 106 (106a through 106n), via the network 102. In some implementations, the messages and status information are sent from the application server 142 to the messaging server 134 for delivery to the computing devices 106. In some implementations, the messaging server 134 may include a messaging module 136o for creating, sending, or receiving messages with messages with smart variable expressive text or graphics. Although only one messaging server 134 is shown, it should be recognized that multiple servers may be used, either in a distributed architecture or otherwise. For the purpose of this application, the operations performed by the system are described in the context of a single messaging server 134.

The application server 142 may be a computing device that includes a processor, a memory and network communication capabilities. The application server 142 is coupled to the network 102, via a signal line 140. The application server 142 may be configured to include the messaging module 136p in some implementations. The application server 142 is a server for handling application operations and facilitating interoperation with back end systems. Although only a single application server 142 is shown, it should be understood that there could be any number of application servers 142 sending messages to the computing devices 106 via the messaging server 134. The application server 142 may send messages to the computing devices 106a through 106n, via the network 102 and the messaging server 134. The application server 142 may also be configured to receive status and other information from the computing devices 106a through 106n, via the network 102.

As depicted in FIG. 1, the messaging module 136 is shown in dotted lines to indicate that the operations performed by the messaging module 136 as described herein can be performed at the computing device 106a, 106n, the messaging server 134 or the application server 142, or any combinations of the these components. Additional structure, acts, and/or functionality of the messaging module 136 are described in further detail below with respect to at least FIG. 2. While the messaging module 136 is described below as cooperating with the user application 108 to create, send, and receive messages, it should be understood that in some implementations, the messaging module 136 could be a stand-alone messaging application independent from any user application 108.

Figure 2:
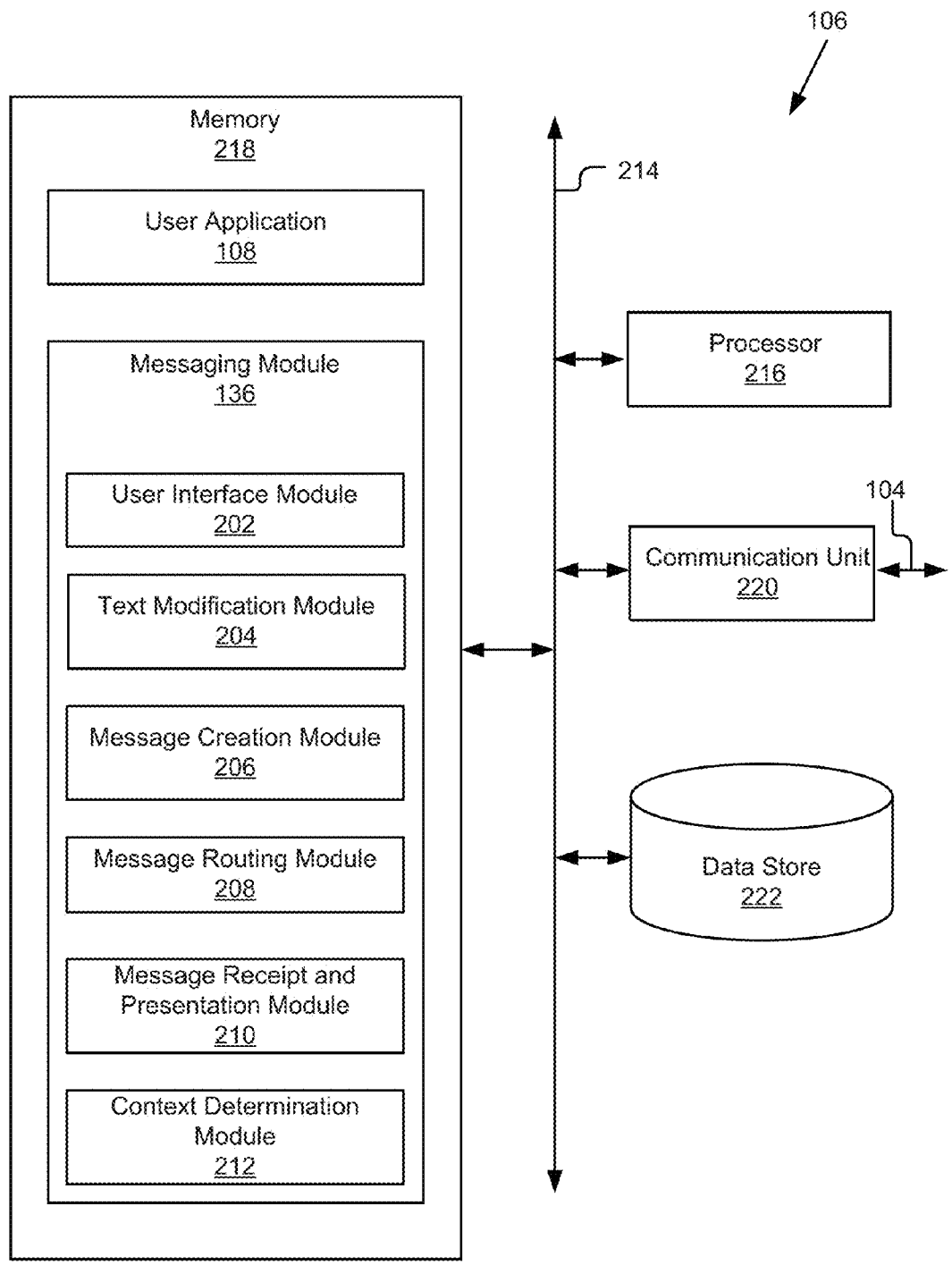
FIG. 2 is a block diagram illustrating an example computing device including a messaging module for smart variable expressive text or graphics.

FIG. 2 is a block diagram of an example computing device 106, which may be representative of the computing device 106, messaging server 134 or application server 142. As depicted, the computing device 106 may include a processor 216, a memory 218, a communication unit 220, and a data store 222, which may be communicatively coupled by a communication bus 214. The memory 218 may include one or more of the user application 108 and the messaging module 136.

The processor 216 may execute software, instructions or routines by performing various input, logical, and/or mathematical operations. The processor 216 may have various computing architectures including, for example, a complex instruction set computer (CISC) architecture, a reduced instruction set computer (RISC) architecture, and/or an architecture implementing a combination of instruction sets. The processor 216 may be physical and/or virtual, and may include a single core or plurality of cores (processing units). In some implementations, the processor 216 may be capable of generating and providing electronic display signals to a display device, supporting the display of images, capturing and transmitting images, performing complex tasks including various types of feature extraction and sampling, etc. In some implementations, the processor 216 may be coupled to the memory 218 via the bus 214 to access data and instructions therefrom and store data therein. The bus 214 may couple the processor 216 to the other components of the computing device 106 including, for example, the memory 218, communication unit 220, and the data store 222.

The memory 218 may store and provide access to data to the other components of the computing device 106. In some implementations, the memory 218 may store instructions and/or data that may be executed by the processor 216. The memory 218 is also capable of storing other instructions and data, including, for example, an operating system, hardware drivers, other software applications, databases, etc. The memory 218 may be coupled to the bus 214 for communication with the processor 216, the communication unit 220, the data store 222 or the other components of the computing device 106. The memory 218 may include a non-transitory computer-usable (e.g., readable, writeable, etc.) media, which can be any non-transitory apparatus or device that can contain, store, communicate, propagate or transport instructions, data, computer programs, software, code, routines, etc., for processing by or in connection with the processor 216. In some implementations, the memory 218 may include one or more of volatile memory and non-volatile memory (e.g., RAM, ROM, hard disk, optical disk, etc.). It should be understood that the memory 218 may be a single device or may include multiple types of devices and configurations.

The bus 214 can include a communication bus for transferring data between components of a computing device 106 or between computing devices 106a, 106n, a network bus system including the network 102 or portions thereof, a processor mesh, a combination thereof, etc. In some implementations, the user application 108 and the messaging module 136 may cooperate and communicate via a software communication mechanism implemented in association with the bus 214. The software communication mechanism can include and/or facilitate, for example, inter-process communication, local function or procedure calls, remote procedure calls, network-based communication, secure communication, etc.

The communication unit 220 may include one or more interface devices for wired and wireless connectivity with the network 102 and the other entities and/or components of the system 100 including, for example, the computing devices 106, the messaging server 134, and the application server 142, etc. For instance, the communication unit 220 may include, but is not limited to, cable interfaces (e.g., CAT-5); wireless transceivers for sending and receiving signals using Wi-Fi™; Bluetooth®, cellular communications, etc.; universal serial bus (USB) interfaces; various combinations thereof; etc. The communication unit 220 may be coupled to the network 102 via the signal lines 104, 132 or 140. In some implementations, the communication unit 220 can link the processor 216 to the network 102, which may in turn be coupled to other processing systems. The communication unit 220 can provide other connections to the network 102 and to other entities of the system 100 using various standard communication protocols, including, for example, those discussed elsewhere herein.

The data store 222 is an information source for storing and providing access to data. In some implementations, the data store 222 may be coupled to the components 216, 218, 220, 108, or 136 of the computing device 106 via the bus 214 to receive and provide access to data. In some implementations, the data store 222 may store data received from the other entities 106, 134, or 142 of the system 100, and provide data access to these entities. The data store 222 can include one or more non-transitory computer-readable media for storing the data. In some implementations, the data store 222 may be incorporated with the memory 218 or may be distinct therefrom. In some implementations, the data store 222 may include a database management system (DBMS). For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

As depicted in FIG. 2, the memory 218 may include the user application 108, and the messaging module 136.

The user application 108 is representative of any user application that is operational on the computing device 106. As noted above, the user application 108 may be a social networking application, a messaging application, a photo sharing application, a video conferencing application, etc. The user application 108 is coupled for communication with the messaging module 136 to receive messages from the application server 142 and send messages, status, commands and other information to the application server 142. In some implementations the user application 108 communicates through the messaging server 134 to the application server 142. For example, communications are from the user application 108 to the messaging module 136a of the computing device 106, then to the messaging server 134, which in turn sends the information to the application server 142.

As depicted, the messaging module 136 includes a user interface module 202, a text modification module 204, a message creation module 206, a message routing module 208, a message receipt and presentation module 210, and a context determination module 212. The components 200, 202, 204, 206, 208, 210, and 212 of the messaging module 136 are coupled for communication with each other and the other components 108, 216, 218, 220, and 222 of the computing device 106 by the bus 214. The components 200, 202, 204, 206, 208, 210, and 212 are also coupled to the network 102 via the communication unit 220 for communication with the other entities 106, 134, 142 of the system 100.

In some implementations, the user interface module 202, the text modification module 204, the message creation module 206, the message routing module 208, the message receipt and presentation module 210, and the context determination module 212 are sets of instructions executable by the processor 216 to provide their respective acts and/or functionality. In other implementations, the user interface module 202, the text modification module 204, the message creation module 206, the message routing module 208, the message receipt and presentation module 210, and the context determination module 212 are stored in the memory 218 of the computing device 106 and are accessible and executable by the processor 216 to provide their respective acts and/or functionality. In any of these implementations, the user interface module 202, the text modification module 204, the message creation module 206, the message routing module 208, the message receipt and presentation module 210, and the context determination module 212 may be adapted for cooperation and communication with the processor 216 and other components 108, 218, 220, and 222 of the computing device 106.

The user interface module 202 may be steps, processes, functionalities or a device including routines for receiving user inputs and then sending those inputs to one or more other components of the messaging module 136 to perform their respective acts and/or functionalities thereon. In some implementations, a user input may include but is not limited to the examples of: 1) inputting content, 2) modifying the expressiveness of the content, 3) adding or removing graphics from a text message, 4) sending a message, 5) receiving and presenting a message, and 6) identifying a conversation or the sender and recipients of a message. More specifically, the user interacts with the user interfaces of FIGS. 4A-8C to input content and an appearance control input. The content may be any text or other data. The appearance control input is an amount of expressiveness to add to the content. Examples of such inputs are described below with reference to the user interfaces of FIGS. 4A-8C. In some implementations, the user interface module 202 may also be configured to generate graphical user interfaces shown in FIGS. 4A-8C and described below. These graphical user interfaces may then be output for display to the user. In some implementations, the user interface module 202 may perform its operations discussed herein in cooperation with one or more components of the messaging module 136. For instance, the user interface module 202 is coupled to the other components of the messaging module 136 to send content and control inputs to or receive content or messages from the text modification module 204, the message creation module 206, the message routing module 208, the message receipt and presentation module 210, and the context determination module 212. The user interface module 202 is also coupled to provide recipients, a sender or a conversation identifier that may be input by the user and used to generate the message. The user interface module 202 is also coupled to the bus 214 for communication and interaction with the other components of the computing device 106 and the system 100.

The text modification module 204 may be steps, processes, functionalities or a device including routines for modifying the appearance of content (e.g., text) in response to user input (e.g., an appearance control input). In particular, the text modification module 204 receives the content and an appearance control input from the user interface module 202. In response to the content and an appearance control input, the text modification module 204 generates the content and additional formatting information. For example, the text modification module 204 may modify the expressiveness of the text in a message before it is sent to the recipients by making it progressively smaller (e.g., to de-emphasize the text/meaning), making it progressively larger (e.g., to emphasize the text/meaning), making it stand out more dramatically (e.g., go beyond just changing the size of the text, and add more emphasis with more visual differentiation with visual effects or flourishes based upon the content of the message). While the expressiveness of the content will be described below primarily in the context of modifying the size of the text to match expressiveness specified by the appearance control input that is merely by way of example and it should be understood that expressiveness may be manifest in any number of visual or audio forms. For example, in place of or in addition to modifications of the size of the content (e.g., text), one or various combinations of visual effects or flourishes may be applied to the content. Examples of visual flourishes include but are not limited to: size, color, shape, font, animation, background, bubble shape, sounds, vibration, etc. In one implementation, the visual effects or flourishes are based upon user preference. In another implementation, the visual effects or flourishes are based on the context as specified by the context determination module 212. In yet another implementation, the visual effects or flourishes are based on the content itself. In response to the content and an appearance control input, the text modification module 204 produces the content and additional formatting information. The content and the additional formatting information may be provided back to the user interface module 202 for presentation back to the user or to the message creation module 206 for the creating a smart variable expressive message. The text modification module 204 is coupled to the bus 214 for communication and interaction with the other components of the messaging module 136, the computing device 106 and the system 100.

The text modification module 204 may also convert the content to a graphic, an animation, an image, combination of the foregoing, or some other surprise representation based on the context. If the user input (e.g., an appearance control input) is beyond a predefined threshold, the text modification module 204 may replace or modify the content with a surprise representation or substitute message. The text modification module 204 may determine the surprise representation or substitute message based on the context. For example, the context may be the context of the user, the context of the communication, the context of the device or any one or more of these contexts. In some implementations, the text modification module 204 also receives a context value from the context determination module 212. In particular, the text modification module 204 use the context value, the appearance control input and the content to generated the surprise representation or substitute message. For example, the context value may be key words (e.g., birthday, anniversary, etc.) detected in conversation of the message. The text modification module 204 then retrieves images and animations associated with that key word and then randomly selects one for use as the surprise representation or substitute message. In another example, the context value may be a location as determined from the location of the computing device 106. The text modification module 204 then retrieves images and animations associated locations near the context value from a database of points of interest then selects the closest one for use as the surprise representation or substitute message. In another example, the context value may a date, time of day, day of year, etc. The text modification module 204 then retrieves images and animations associated date (e.g. a New Year's Day, Halloween or event) from a database of images and animations associated with that date then selects the one nearest in time use as the surprise representation or substitute message. The surprise representation or substitute message and the additional formatting information may then be provided back to the user interface module 202 for presentation back to the user or to the message creation module 206 for the creating of a smart variable expressive message. In some implementations, the content and formatting information is converted or rendered as an image and the image as the message content. The text modification module 204 is coupled to the context determination module 212 to receive the context value, the user interface module 202 to receive the content and the appearance control input, and the user interface module 202 and the message creation module 206 to send the surprise representation or substitute message and the additional formatting information.

The message creation module 206 may be steps, processes, functionalities or a device including routines for creating a message that includes content and formatting as well as routing information. The message creation module 206 is coupled to the user interface module 202 to receive input to create a message. In some implementations, the user interface module 202 also provides a conversation identifier, a sender and recipients so that the message creation module 206 can determine the sender and recipients for the message being created. The message creation module 206 is coupled to the text modification module 204 to receive the content and formatting information or the surprise representation and the additional formatting information. Responsive to receiving a create message signal from the user interface module 202, the message creation module 206 creates a message including a sender, recipients and a payload having the content and formatting information. For example, the message creation module 206 is coupled to receive the text and formatting information from the text modification module 204, create a message that includes the text and any associated display attributes and send the message to the message routing module 208 for delivery to a recipient. The message may also be sent back to the user interface module 202 to be presented to the sender with an indication that the message has been send. The message creation module 206 is coupled to the user interface module 202 to receive input and send a copy of the message. The message creation module 206 is coupled to the text modification module 204 to receive the content and formatting information for the message. The message creation module 206 is coupled to message routing module 208 to send the message for delivery to other messaging modules 136. The text modification module 204 is coupled to the bus 214 for communication and interaction with the other components of the messaging module 136, the computing device 106 and the system 100.

The message routing module 208 may be steps, processes, functionalities or a device including routines for processing, sending and receiving messages at the messaging module 136. The message routing module 208 is coupled to the message creation module 206 to receive messages to be sent to other computing devices 106. The message routing module 208 receives the message from the message creation module 206, and then routes and sends the message to other computing devices 106. The message routing module 208 also receives messages from other computing devices 106 and routes them to the message receipt and presentation module 210 for presentation in the user interface. In some implementations, the message routing module 208 uses phone numbers to route messages. For example, the message routing module 208 sends the message using an SMS channel of a cellular network. In some implementations, the message routing module 208 includes an address book (not shown) to translate nicknames, emails addresses and other identifiers to phone numbers that can be used to send the messages. The message routing module 208 may receive the message including any one of these identifiers from the message creation module 206, translates the identifier(s) to phone number(s) then send the message to the phone number(s). The message routing module 208 is coupled to the message creation module 206 to receive messages to send, and to the other messaging modules 136 to receive messages from them. The message routing module 208 is also coupled to the message receipt and presentation module 210 to send messages received from the other messaging modules 136.

The message receipt and presentation module 210 may be steps, processes, functionalities or a device including processing routines for receiving messages at the messaging module 136 and using the formatting information to create a message with variably expressive appearance for display in the user interface. The message receipt and presentation module 210 receives message from other computing devices 106 via the message routing module 208. The message receipt and presentation module 210 determines the content and formatting for variable expressive text or graphics from the message. The message receipt and presentation module 210 re-creates the variable expressive text or graphics using the determined content and formatting. The message receipt and presentation module 210 then sends the variable expressive text or graphics to the user interface module 202 for presentation to the user. The message receipt and presentation module 210 is coupled to receive messages from the message routing module 208 and coupled to the user interface module 202 to provide the variable expressive text or graphics. The message receipt and presentation module 210 is coupled to the bus 214 for communication and interaction with the other components of the messaging module 136, the computing device 106 and the system 100.

The context determination module 212 may be steps, processes, functionalities or a device including routines for determining a context of a message. For example, the context may be the context of the user, the context of the communication (e.g., the conversation of the message), the context of the device, the location of one or more users, or any one or more of these contexts. After receiving user consent to use her information to determine context, the context of the user can be determined by accessing applications or services used by the user. For example, the email, browser search history, activity on applications, activity on social networks, interaction with video sharing service, etc. may be accessed to determine one or more context values. The context of the user may include time of day, day of week or month, year, weather, event, feelings, attitude, mood of user, state of the user, etc. or combinations of the foregoing. In some implementations, again after receiving user consent to use her information, the context of the communication may be determined. For example, the conversations to which the message is being added, past messages, past conversations, past recipients, past senders, etc. may be used to determine one or more context values. After receiving user consent to use her information, in some implementations, the context of the user computing device 106 can be determined. For example, information can be retrieved from the computing device 106, such as time, location, activity, state, signals received, message streams, past messages, recipients of a message, etc. Based on a variety of signals such as those just identified alone or in combination, the context determination module 212 determines a context of the message and may select formatting or other graphics for the messages based on the identified context. In some implementations, ranking, descriptive statistics, machine learning, etc. may be used to determine context values. In one implementation, the context of the user may be determined from activities of the user on the services or applications. For example, whether the user is working, on vacation, searching for airline flight hotels, etc. may be used to a context for the user and that context can be sent to the message creation module 206. In some implementations, the context of the communication may be determined by searching for unique key words and the frequency of their use in recent conversations. For example, upon identifying certain key words like "birthday," "anniversary," "congratulations," "party," etc. a particular graphic or festive picture may be selected or generated or the word themselves may be sent to the message creation module 206. In some implementations, the context of the computing device such as location, time zone, etc. may be used to determine a context of morning or evening and a particular graphic or picture may be selected or generated or the words themselves may be sent to the message creation module 206. The context value is generated by the context determination module 212 and provided to the message creation module 206 to determine content for the message. The context determination module 212 is coupled to the bus 214 for communication and interaction with the other components of the messaging module 136, the computing device 106 and the system 100.

Methods

Figure 3A:
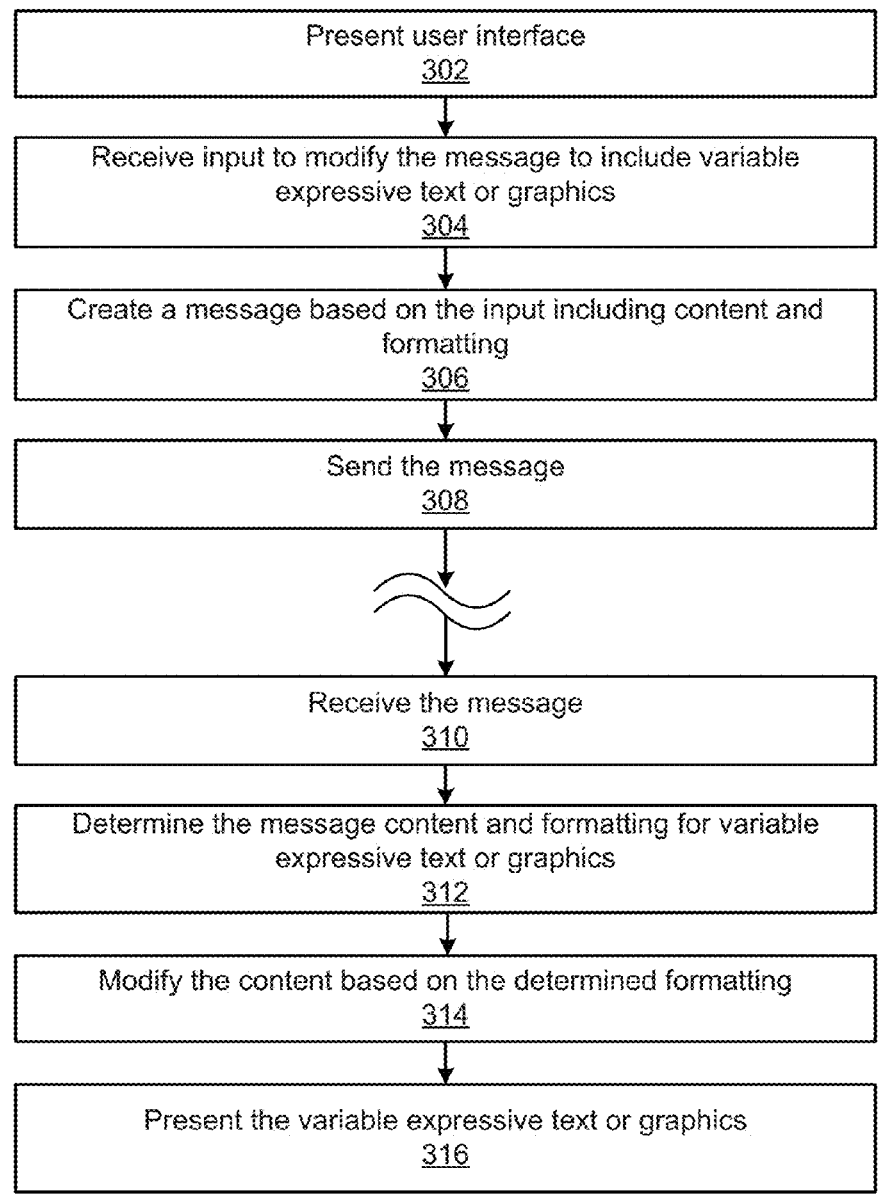
FIG. 3A is a flowchart illustrating an example method for generating, sending and receiving a message with smart variable expressive text or graphics.

FIG. 3A is a flowchart illustrating an example method 300 for generating, sending, receiving or displaying a message with smart variable expressive text or graphics in accordance with the present disclosure. The method 300 begins by presenting 302 a user interface 400 (See also FIGS. 4A-4I). The user interface 400 may be presented on the computing device 106 by the messaging module 136. For example, user interface 400 is similar to those shown in FIGS. 4A-8D and can be presented on the computing device 106. This user interface 400 may include a What You See Is What You Get (WYS TWIG) presentation of the processed input. The user interface 400 includes a content input region 404 for inputting content and an expressiveness control indicator 420. The user can input content (e.g., text) into the content input region 404. The content is received and processed by the user interface module 202 of the messaging module 136. Initially, this content input region 404 is blank, but once any content is input to the content input region 404, the expressiveness control indicator 420 is presented on the user interface 400 by the user interface module 202. Then method 300 receives 304 input to modify the message to include variable expressive text or graphics. The input to modify the appearance or expressiveness of the content can be selection and movement of the expressiveness control indicator 420. In some implementations, the user interface 400 is updated to reflect movement of the expressiveness control indicator 420. More specifically, the position of the expressiveness control indicator 420 on the user interface 400 is modified and the input content is modified in appearance responsive to movement of the expressiveness control indicator 420 by the user interface module 202. Once the user has finished modifying the text and reached a desired state (for example, as indicated by releasing the expressiveness control indicator 420), the method 300 creates 306 a message based on the input including content and formatting. For example, the message is created by the message creation module 206 of the messaging module 136. Then the computing device 106 sends 308 the message created in block 306 to one or more other computing devices 106 or servers 134, 142. More specifically, the message with smart variable expressive text is provided by the message creation module 206 to the message routing module 208 and the message routing module 208 sends 308 to the recipients identified in the message using the messaging capability of the computing device 106. In some implementations, the sent message is added to the conversation 402 in the user interface 400 by the user interface module 202.

At block 310, the method 300 continues with the message with smart variable expressive text being received 310 by another computing device 106. For example, the message is received by the message routing module 208 of the computing device 106. The message routing module 208 sends the message to the message receipt and presentation module 210 of the computing device 106 for processing. The message is processed to determine 312 the message content and formatting for variable expressive text or graphics. The message receipt and presentation module 210 of the computing device 106 then modifies 314 the content based on the determined formatting in block 312. The method 300 then provides for display or presents 316 the message with the variable expressive text or graphics in the user interface of the computing device 106. More specifically, the message receipt and presentation module 210 sends the appropriately formatted content to the user interface module 202 for addition as a received message in the conversation.

Figure 3B:
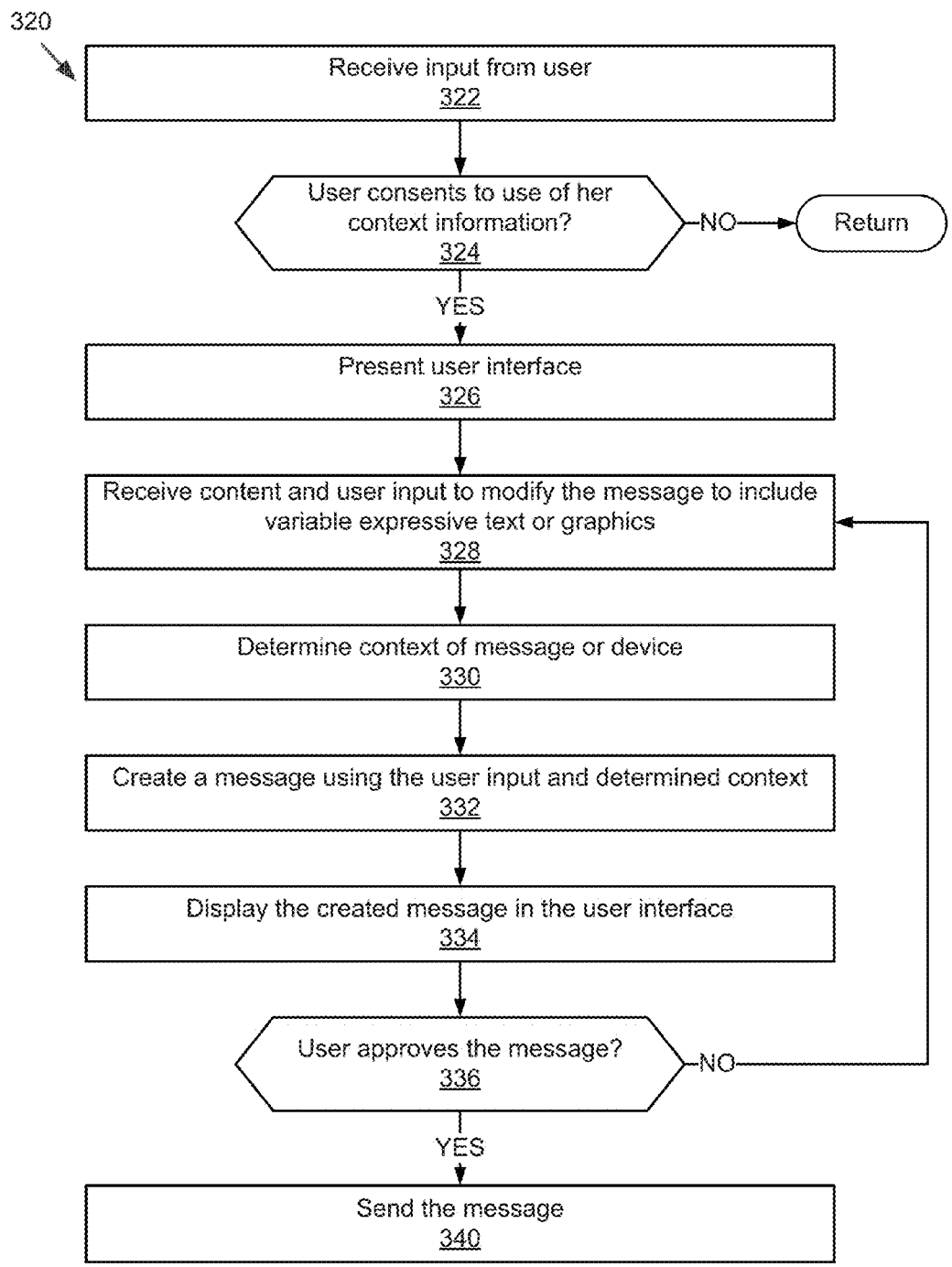
FIG. 3B is a flowchart illustrating another example method for generating and sending a message with smart variable expressive text or graphics.

Referring now to FIG. 3B, another example method 320 for generating and sending a message with smart variable expressive text or graphics is described. The method 320 begins by receiving 322 input from the user. Then the method 320 determines 324 whether the received input in block 322 was user consent to use her context information. If not, the method 320 returns and processes the message without allowing addition of variable expressive text. However, if the input received by the messaging module 136 in block 322 was user consent, the method 320 continues to present 326 the user interface 400. The user interface 400 may be similar to those described below with reference to FIGS. 4A-8D and presented by the user interface module 202 of the messaging module 136. The method 320 continues by receiving 328 content and user input to modify the expressiveness of the message to include variable expressive text or graphics via the user interface module 202. As noted above, in some implementations the input varies the expressiveness of the text responsive to the movement of the expressiveness control indicator 420. In some implementations, the expressiveness control indicator 420 is moved beyond a threshold to indicate that the content should be replaced by a surprise or substitute message. The method 320 continues by determining 330 a context of the message, the user or the computing device 106. For example, the context determination module 212 may determine the context based on various signals as has been described above. The method 320 then creates 332 a message using the determined context and the input message content. For example, the message creation module 206 in cooperation with the context determination module 212 may create the message. The message is then presented 334 by the user interface module 202 as part of the conversation 402 in the user interface 400. Next, the method 320 determines 336 whether the user has input a signal indicating approval of the message. If so, the method 320 sends 340 the message as has been described above. If not, the method 320 returns to block 328 to receive additional input modifying the expressiveness of the content.

User Interfaces

Referring now to FIGS. 4A-8D, user interfaces for creating and sending a message with smart variable expressive text or graphics are described.

Figure 4A:
FIGS. 4A-4J are graphical representations of a first example user interface creating, sending, receiving or displaying messages with smart variable expressive text or graphics.

More specifically, FIGS. 4A-4J show a first example of user interfaces for creating and sending a smart variable expressive text message. FIG. 4A shows a user interface 400, for example, presented on computing device 106 such as a mobile phone. The user interface 400 includes a text message stream or conversation 402, a content input region (e.g., a text box) 404 for inputting message content, a suggestion region 406 with auto generated suggested replies that may include text or emojis, a text suggestion area 414 and a keyboard 416. The text message stream or conversation 402 includes identifiers of message senders in chronological order in which they were received. Below the conversation 402, is the suggestion region 406 having buttons corresponding to auto generated suggested replies that may be selected by the user to send the suggested reply corresponding to button. Below the suggestion region 406 is the content input region 404. The content input region 404 may include an emoji button 408, a voice message button 410, and an attachment drawer button 412. The voice message button 410 allows the user to record a voice message or input sounds that can be converted to text. The emoji button 408 when selected presents a list of possible emojis to send. The attachment drawer button 412 when selected presents a list of possible attachments such as videos, images graphics, etc. that may be sent as a message or added to a message. The FIG. 4A shows the user interface 400 once the messaging application is first opened. As depicted, the content input region 404 may include an instructional message such as "Write a message" to indicated that the user interface 400 is in an initial state and that the content input region 404 is provided for the user to input content.

Figure 4B:
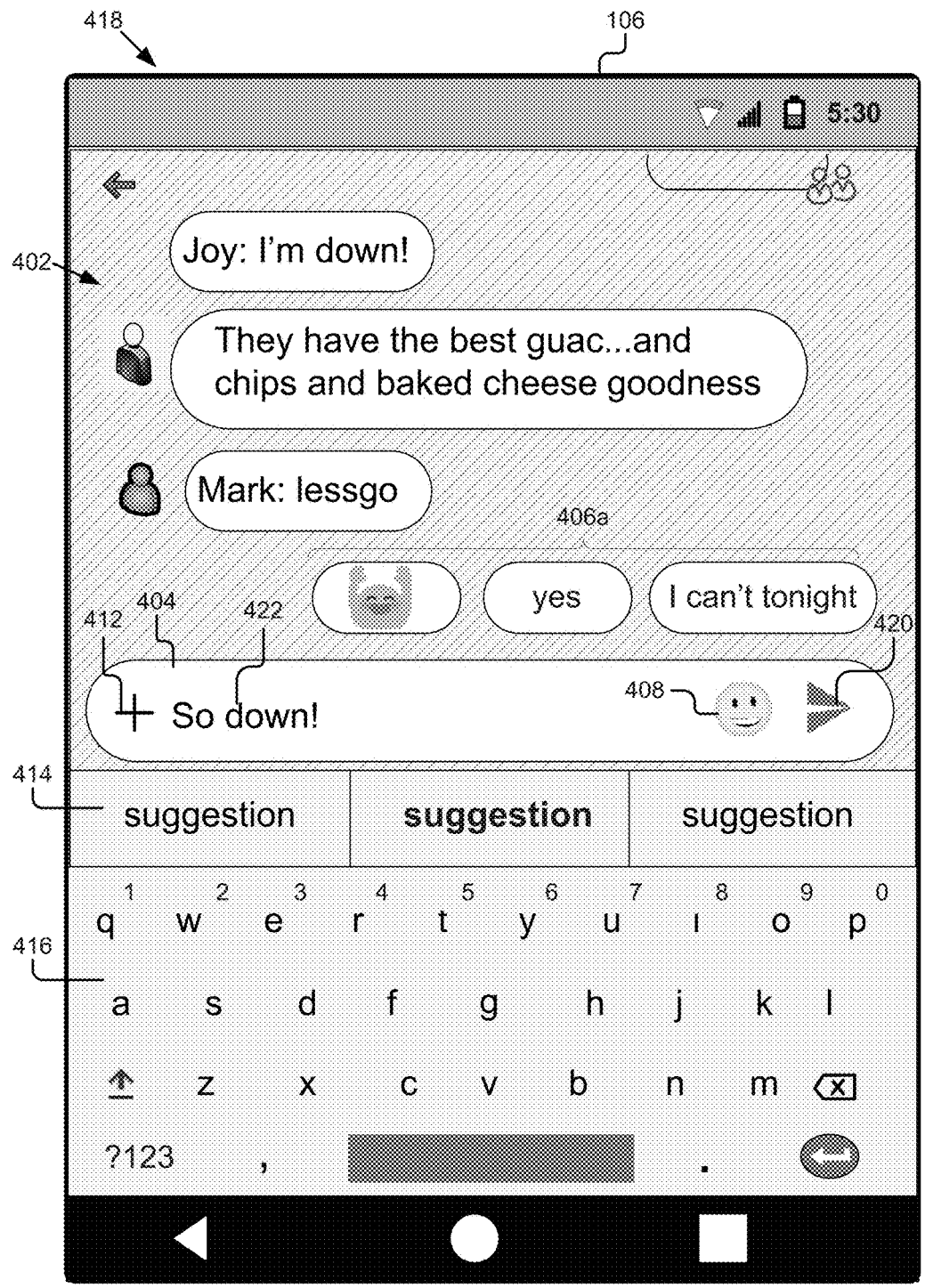

Once the user begins inputting text 422 into the content input region 404, the user interface 400 transitions to user interface 418 of FIG. 4B. As shown in FIG. 4B, the user interface 418 replaces the voice message button 410 with an expressiveness control indicator 420. In this example, the user has input the text "So down!" 422 into the content input region 404. This input is detected by the user interface module 202 and causes the user interface module 202 to update the content input region 404 with the expressiveness control indicator 420.

Figure 4C:
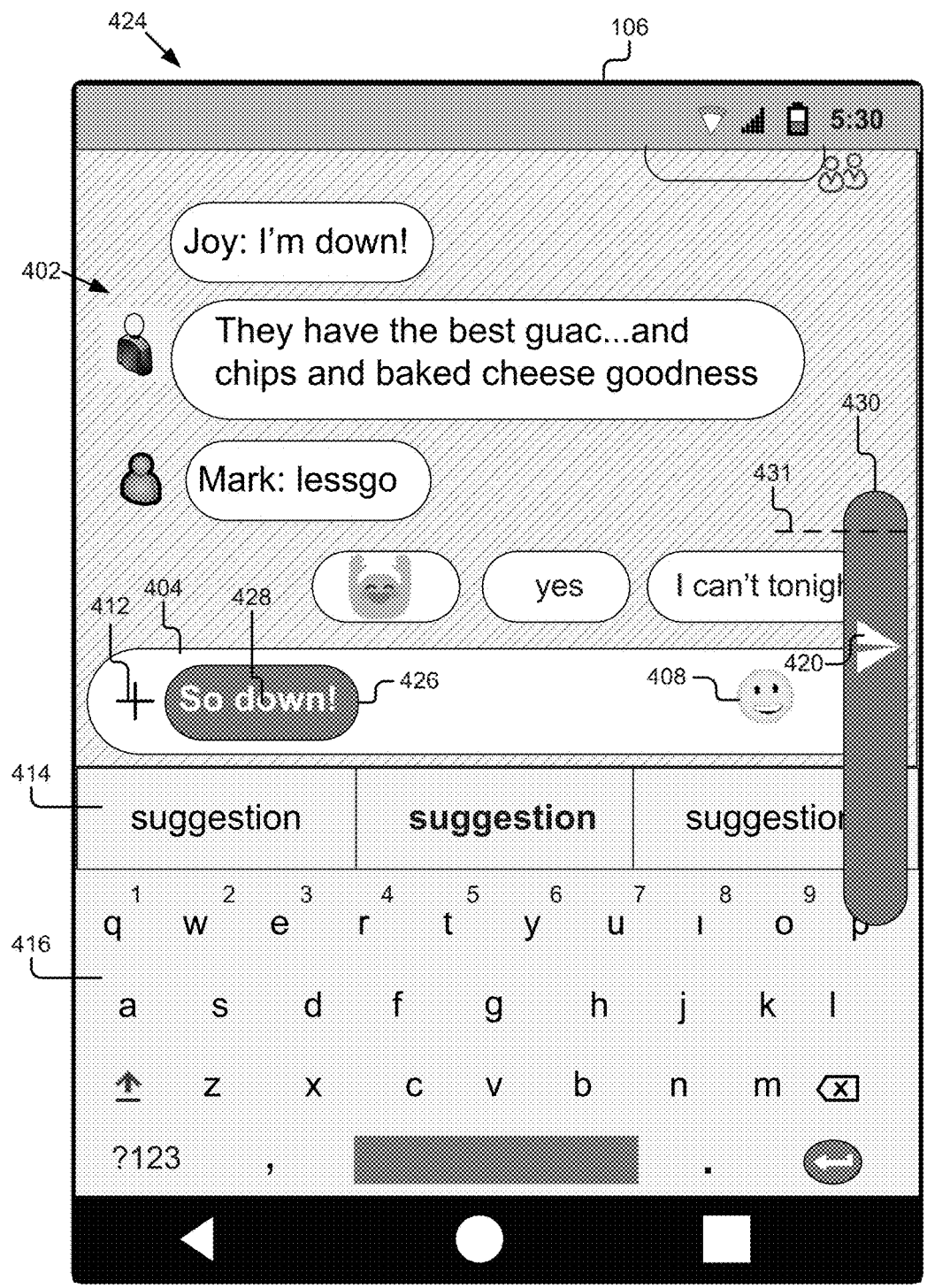

Once the user selects the expressiveness control indicator 420, the user interface 418 transitions to user interface 424 of FIG. 4C. The user interface 424 of FIG. 4C adds a highlight area 426 and a slider bar 430. For example, the selection of the expressiveness control indicator 420 could be a pressing of the expressiveness control indicator 420 for a predetermined amount of time (e.g., a long press). This long press signal is received by the user interface module 202 and causes the user interface module 202 to present the slider bar 430 indicating where the expressiveness control indicator 420 may be moved to modify the expressiveness level of the input text. The selection of the expressiveness control indicator 420 may also cause the input content to appear within a highlight area 426. Additionally, the input content 428 is modified in appearance corresponding to the amount of movement of the expressiveness control indicator 420 from its original position. As depicted in FIG. 4C, the user has moved the expressiveness control indicator 420 slightly in a first direction (upward) from its original position. Responsive to that movement of the expressiveness control indicator 420, the content is modified to be slightly more expressive by the text modification module 204 by increasing the text in size, for example, and the user interface module 202 updates the user interface 424 of FIG. 4C to show the text "So down!" 428 modified and slightly enlarged. The user interface 424 of FIG. 4C also depicts with a dashed line, a non-visible predefined threshold 431 on slider bar 430. If the user moves the expressiveness control indicator 420 in a first direction beyond the predefined threshold 431 the text is replaced with a substitute or surprise message as will be discussed in more detail below with reference to FIGS. 4H-4J. It should be understood that in other implementations, the predefined threshold 431 on slider bar 430 may be shown in the user interface 424 by some marking indicating its position. Although not shown in FIG. 4C, the expressiveness control indicator 420 may be modified in color, shape or other visual appearance once the user moves the expressiveness control indicator 420 beyond the threshold 431 as a mechanism to provide the user with feedback that a substitute or surprise message will replace the input content.

Figure 4D:
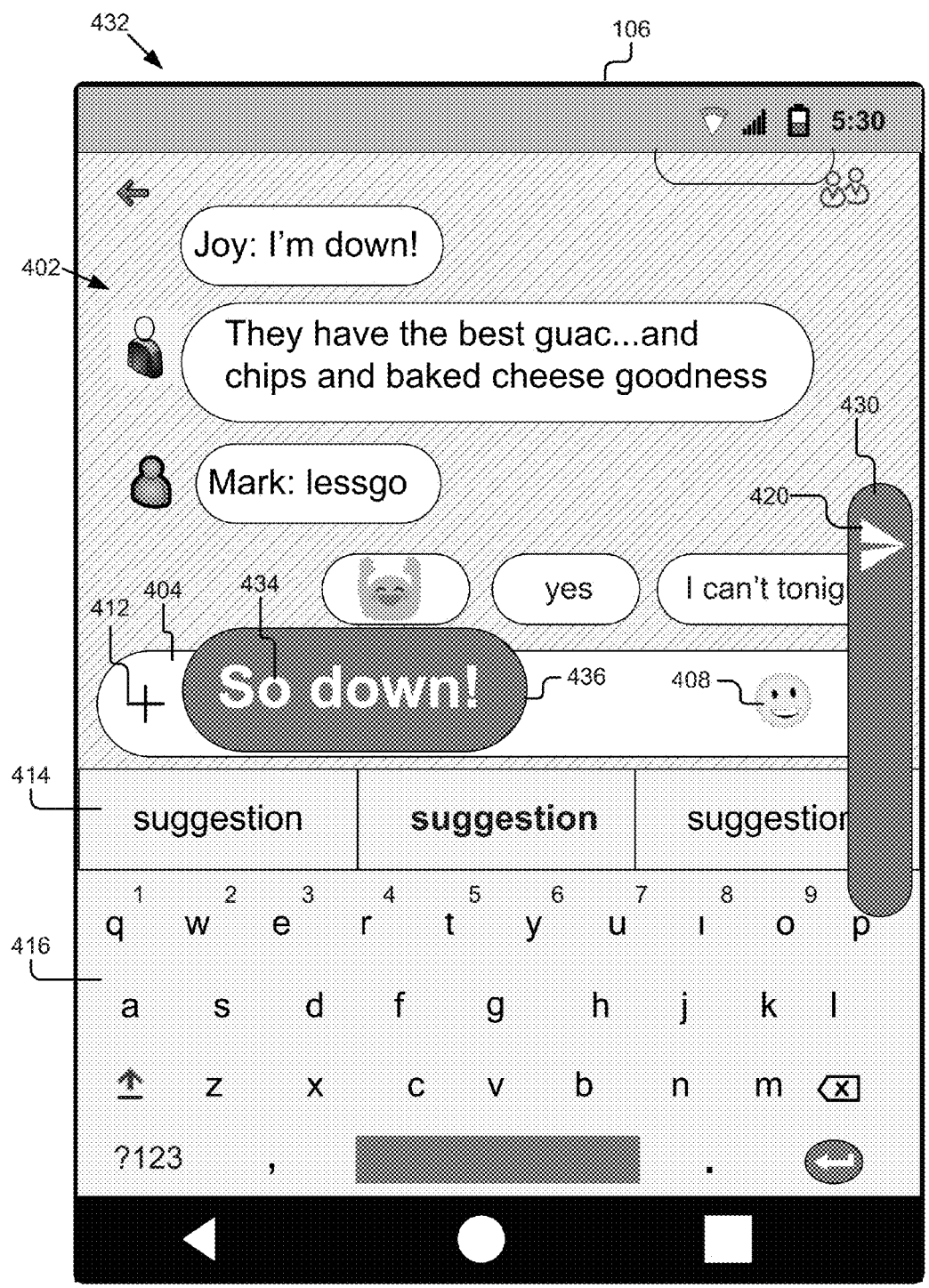

Referring to FIG. 4D, the user interface 432 has been updated responsive to additional movement of the expressiveness control indicator 420 in the first direction. As can be seen by a comparison of the position of the expressiveness control indicator 420 in FIG. 4C versus FIG. 4D, the position of the expressiveness control indicator 420 is closer to the end of the slider bar 430 than the middle (its original position in FIG. 4B). Responsive to that movement of the expressiveness control indicator 420, the content is modified to be significantly more expressive by the text modification module 204 by increasing the text in size and the user interface module 202 updates the user interface 432 of FIG. 4D to show the text "So down!" 434 modified and greatly enlarged. The user interface 432 of FIG. 4D also depicts the input content to appear within an enlarged highlight area 436. The size of both the text 434 and the highlight area 436 are increased to provide more expressiveness based on the position of the expressiveness control indicator 420.

Figure 4E:
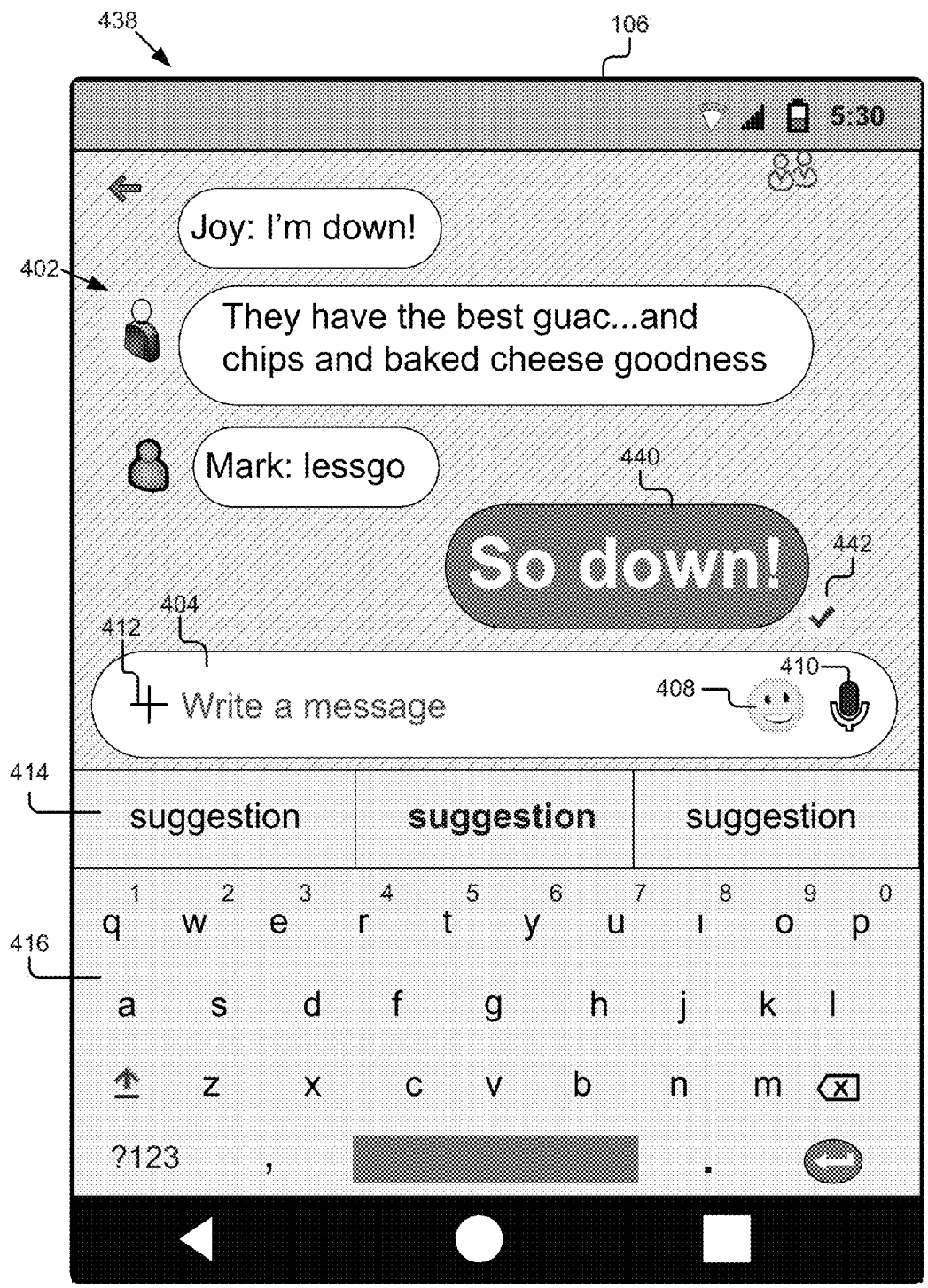

Referring to FIG. 4E, the user interface 438 has been updated responsive to the user's interaction with the expressiveness control indicator 420. For example, once the user has the expressiveness level of the text at a desired level, the user may signal via the user interface 438 to send the message. In one implementation, the user signals that she wants to send the message by releasing the expressiveness control indicator 420. Once the message has been sent, the user interface module 202 updates the user interface 438 with the message 440 including formatting showing how the message 440 was sent in the conversation 402. The user interface 438 also includes a marker 442 proximate the message 440 with variable expressive text to signify that the message has been sent. The content input region 404 appears in the user interface 438 in its original form beneath the sent message similar to its appearance in FIG. 4A.

Figure 4F:
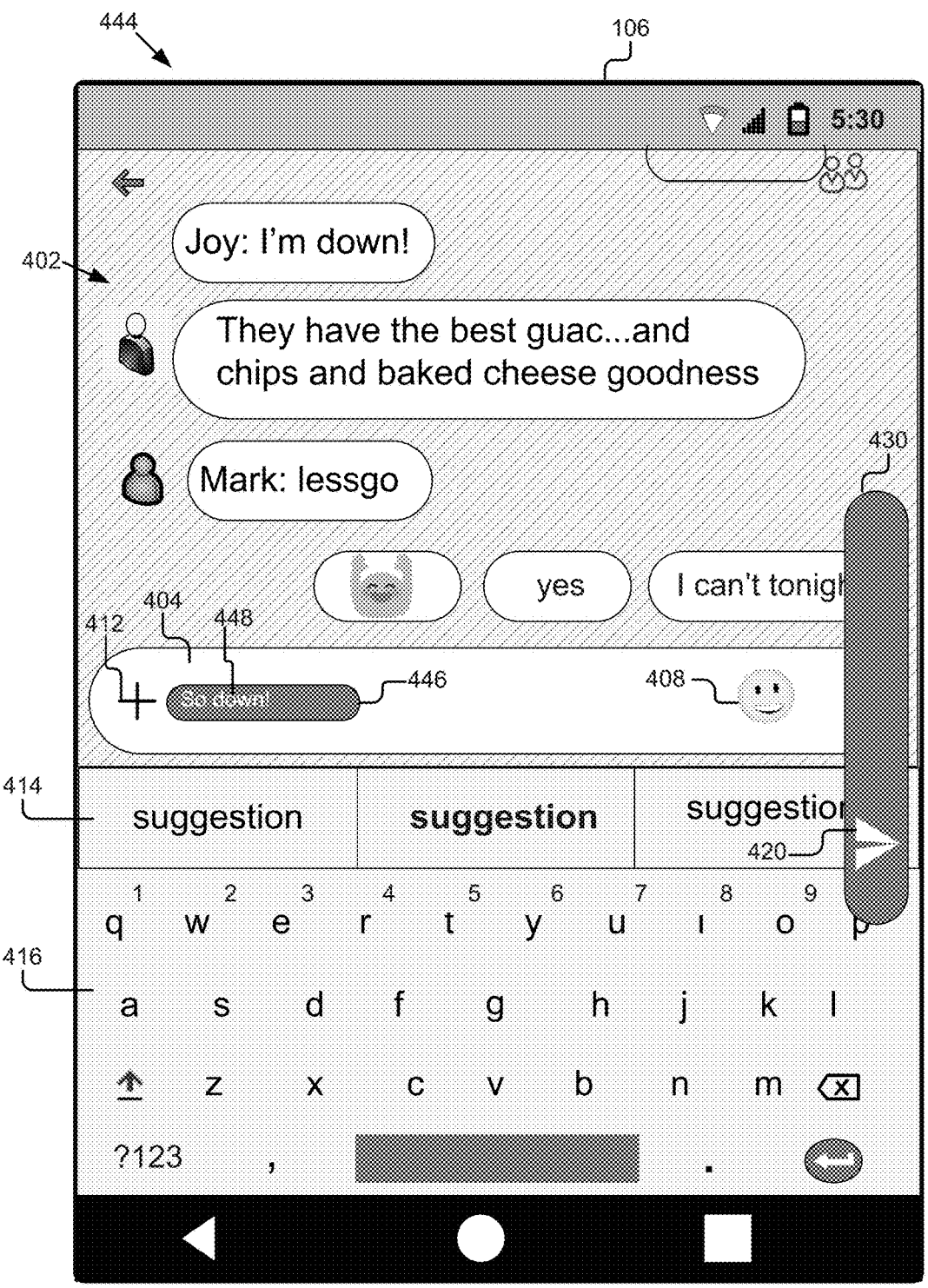

Referring to FIG. 4F, the user interface 444 has been updated responsive to additional movement of the expressiveness control indicator 420 in a second direction, opposite the first direction. As can be seen by a comparison of the position of the expressiveness control indicator 420 in FIG. 4C versus FIG. 4F, the position of the expressiveness control indicator 420 is closer to a second end of the slider bar 430 than the middle (its original position in FIG. 4B). Responsive to that movement of the expressiveness control indicator 420, the content is modified to be significantly less expressive by the text modification module 204 by decreasing the text in size, for example, and the user interface module 202 updates the user interface 444 of FIG. 4F to show the text "So down!" 448 modified and greatly reduced in size. The user interface 444 of FIG. 4F also depicts the input content 448 to appear within a smaller highlight area 446. The size of both the text 448 and the highlight area 446 are decreased to reflect a lower level of expressiveness based on the position of the expressiveness control indicator 420.

Figure 4G:
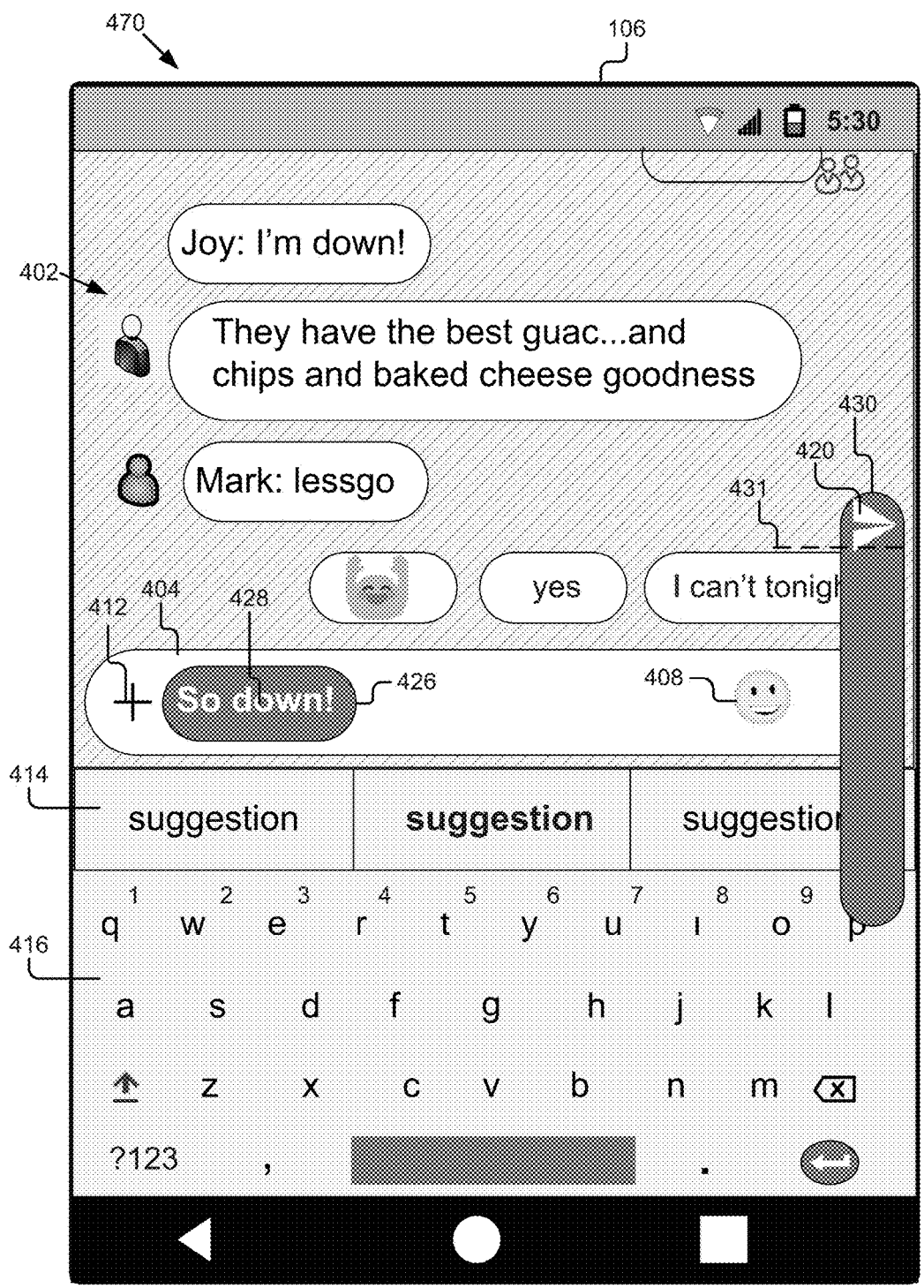

Referring to FIG. 4G, the user interface 470 has been updated responsive to additional movement of the expressiveness control indicator 420. In this example, the expressiveness control indicator 420 has been moved in the first direction to satisfy the threshold 431. Responsive to the user releasing the expressiveness control indicator 420 in the position depicted in FIG. 4G, the messaging module 134 generates a substitute or surprise message and adds it to the conversation 402. As described above, the substitute or surprise message is determined based on the input content and the context of the message, the user or the device.

Figure 4H:
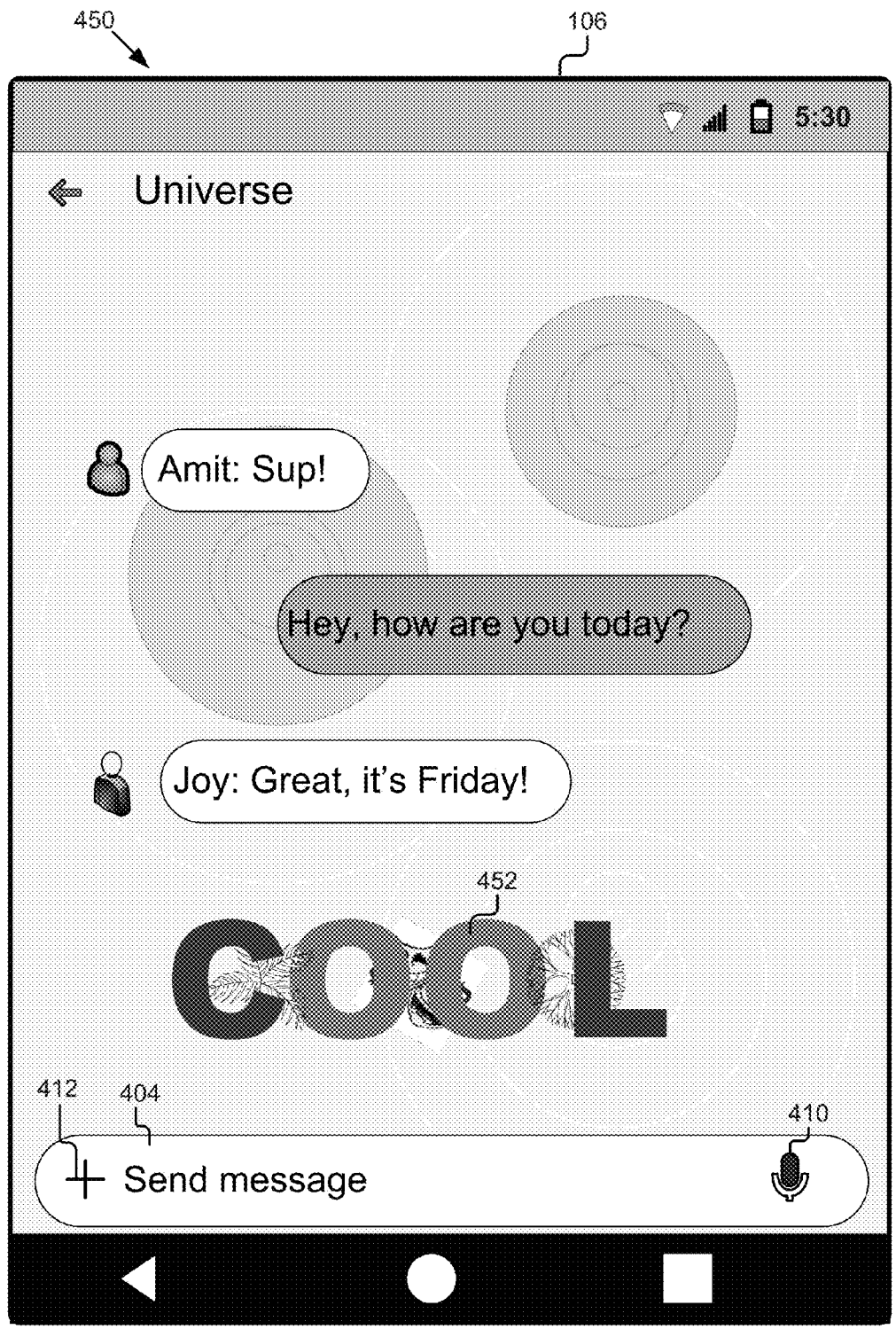
Figure 4I:
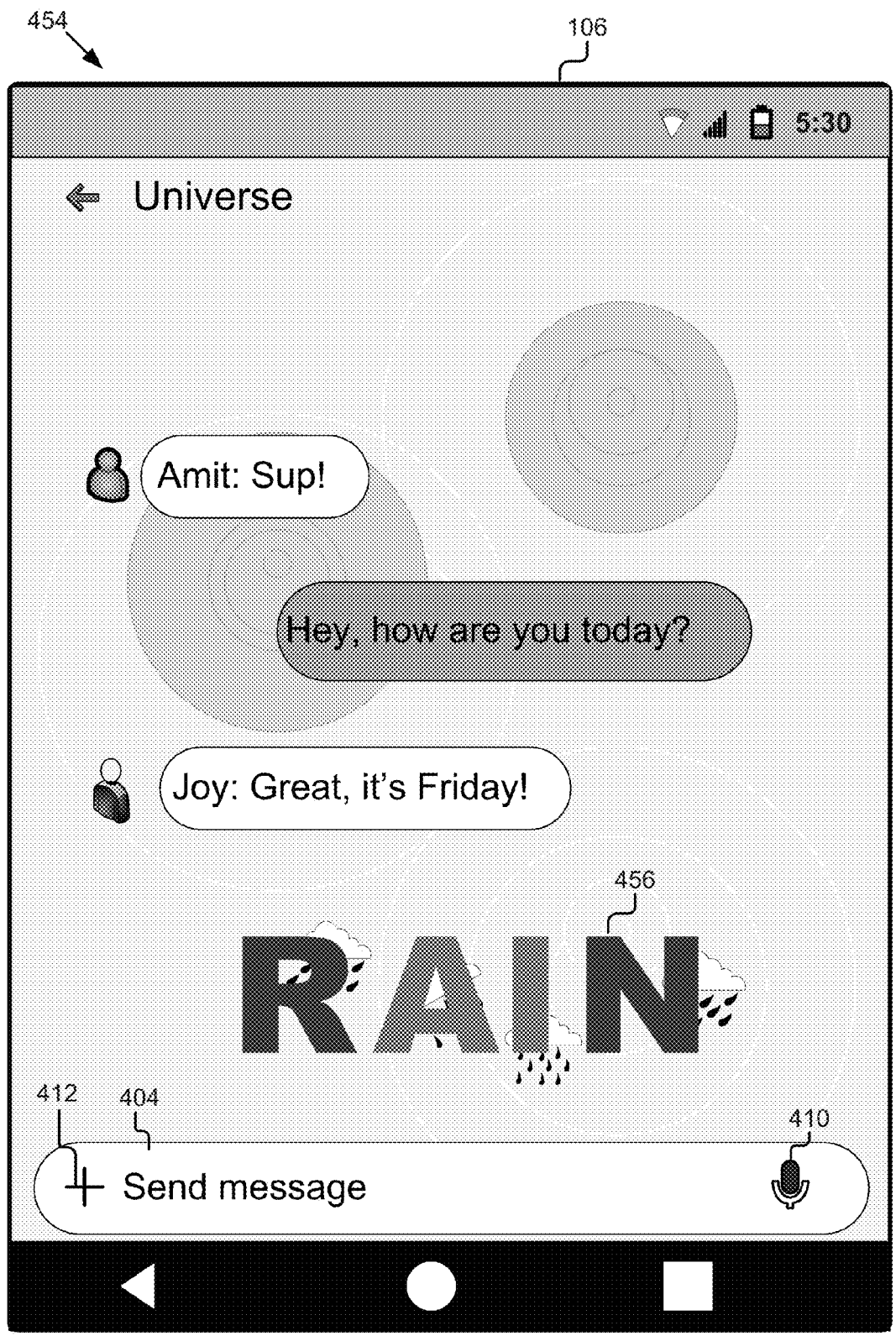
Figure 4J:
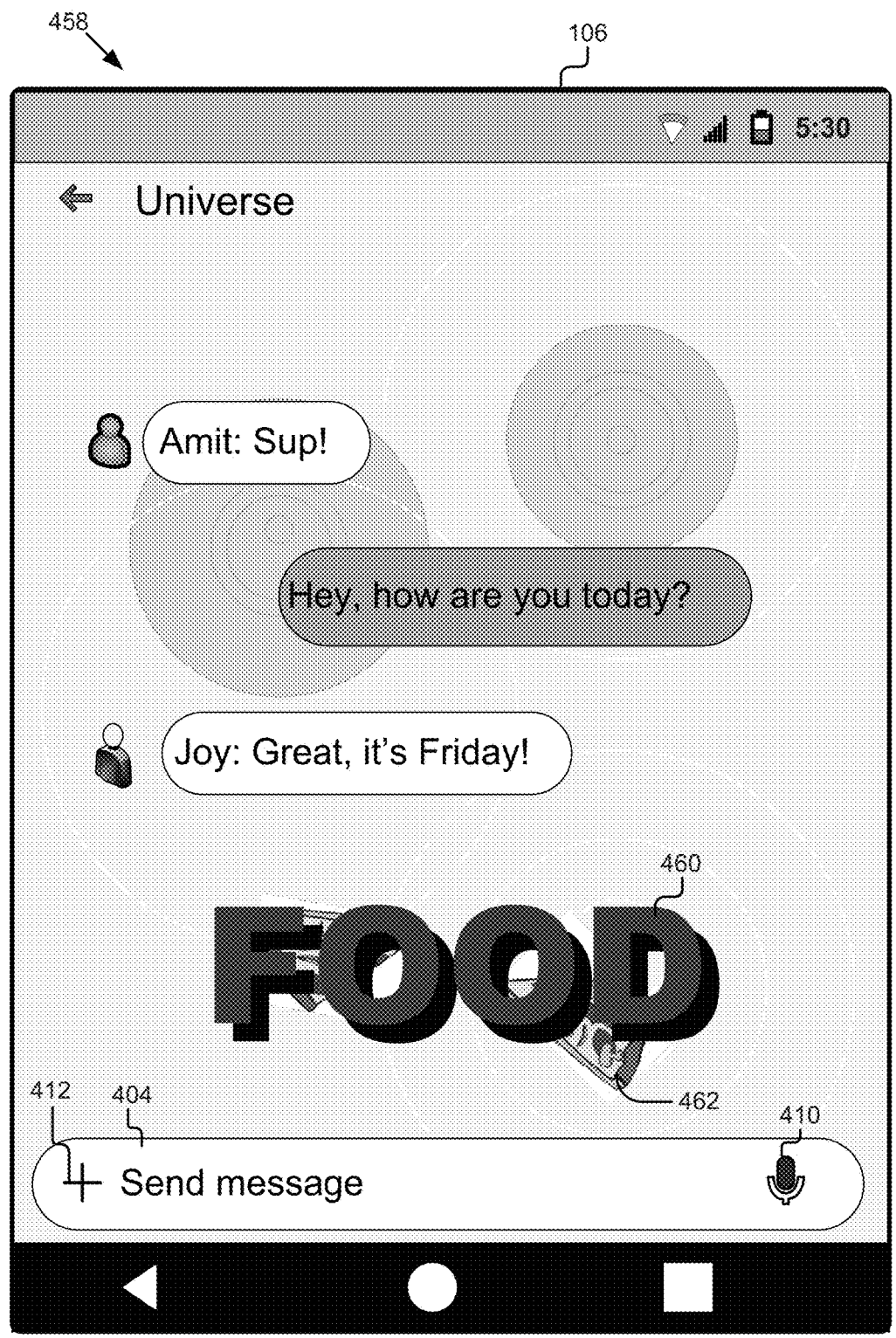

Example substitute or surprise messages are depicted in the conversation in FIGS. 4H, 4I and 4J. FIG. 4H shows a user interface 450 including a substitute message with a graphical highly stylized text "COOL" 452. This illustrates and example of the context of the message and the user being used to generate a surprise response. FIG. 4I shows a user interface 454 including a substitute message with a graphical highly stylized text "RAIN" 456. Additionally, the rain drops on the substitute message are animated. This illustrates and example of the context of device (e.g., the location of the device and the weather at that location) are used to generate a surprise response. FIG. 4J shows a user interface 458 including a substitute message with a graphical highly stylized text "FOOD" 460. Additionally, an animation 462 of slices of pizza are moving in the background behind the stylized text "FOOD" 460 in the substitute message. This also an example where the content can be composited over an image. In some implementations, the messages of the type in FIGS. 4H, 4I and 4J are graphics interchange format (GIF) files.

Referring now to FIGS. 5A-5E, a second example user interface for creating and sending messages with smart variable expressive text or graphics is described. For convenience and ease of understanding like reference numerals are used in FIGS. 5A-5E to depict components of the user interface with similar functionality as that described above for FIGS. 4A-4J.

Figure 5A:
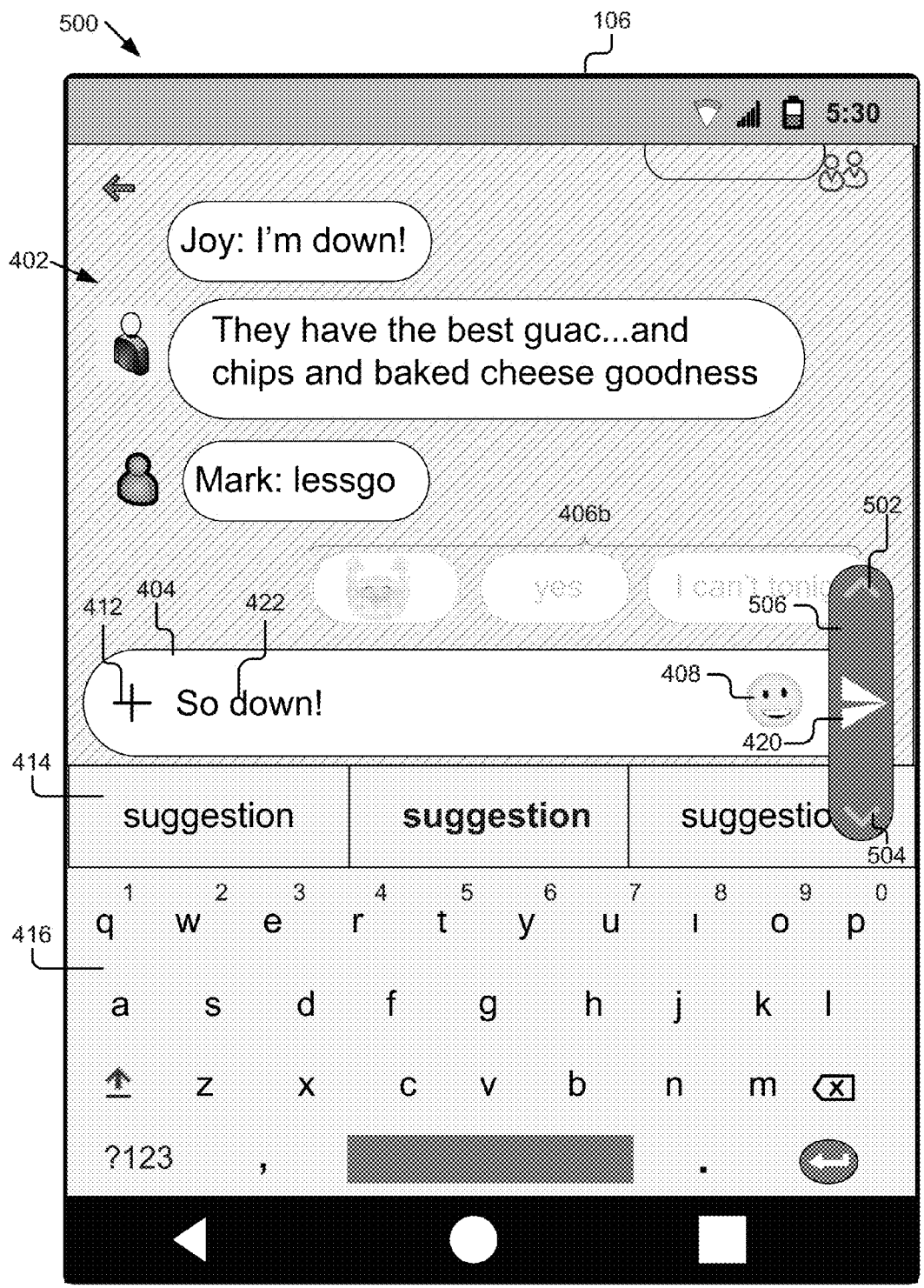
FIGS. 5A-5E are graphical representations of a second example user interface creating, sending, receiving or displaying messages with smart variable expressive text or graphics.

The user interface 418 of FIG. 4B including the expressiveness control indicator 420 as has been described above is first presented to the user. FIG. 5A shows a user interface 500 with the presentation of a visual hint 506 having visual cues 502 and 504. In response to the user selecting the expressiveness control indicator 420, the user interface module 202 causes the visual hint 506 having visual cues 502 and 504 to be displayed for a limited amount of time. For example, if the user depresses the expressiveness control indicator 420 for some predefined time duration (e.g., something longer than a tap but shorter than a long press) the visual hint 506 is presented as part of the user interface 500. The visual hint 506 is presented for a limited amount of time to provide the user with information about how to manipulate the expressiveness control indicator 420. In particular, the visual hint 506 has visual cues 502 and 504 that are an upward arrow and a downward arrow, respectively, to suggest to the user how to move the expressiveness control indicator 420. The user interface 500 also shades the suggestion region 406*b* and deactivates the suggested reply buttons. It should also be noted that the content input region 404 is not modified include the highlight area 426.

Figure 5B:
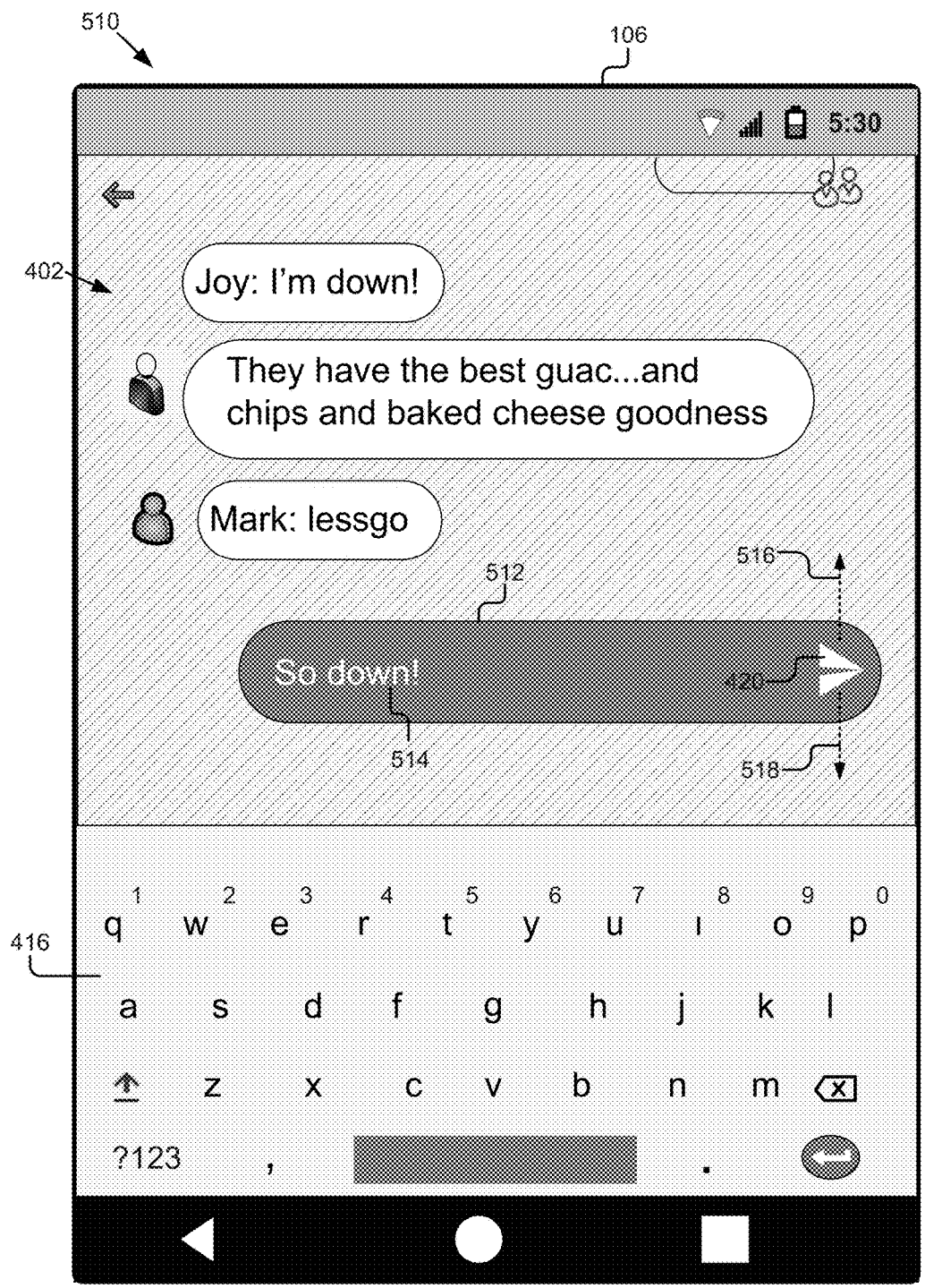
Figure 5C:
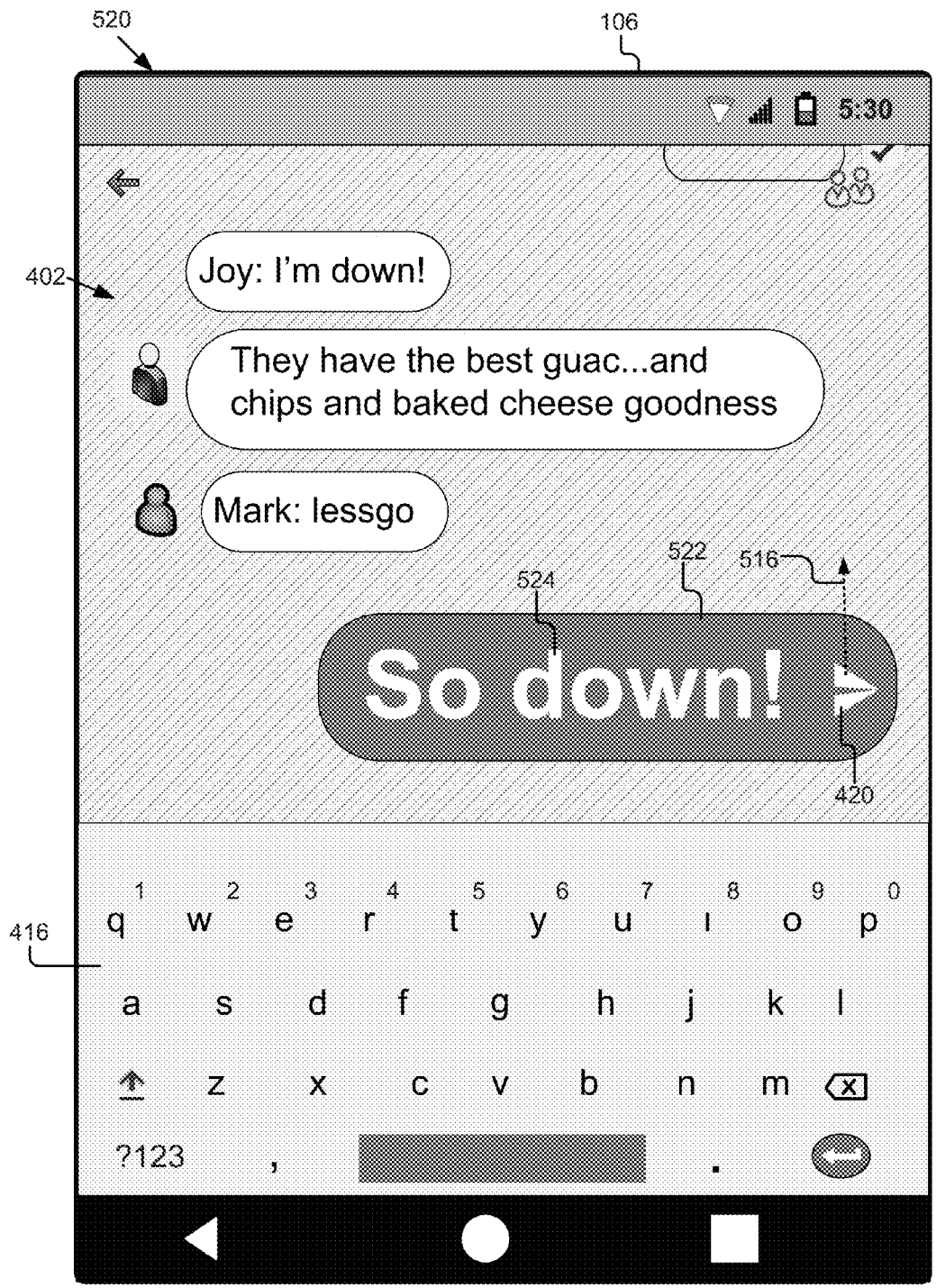
Figure 5D:
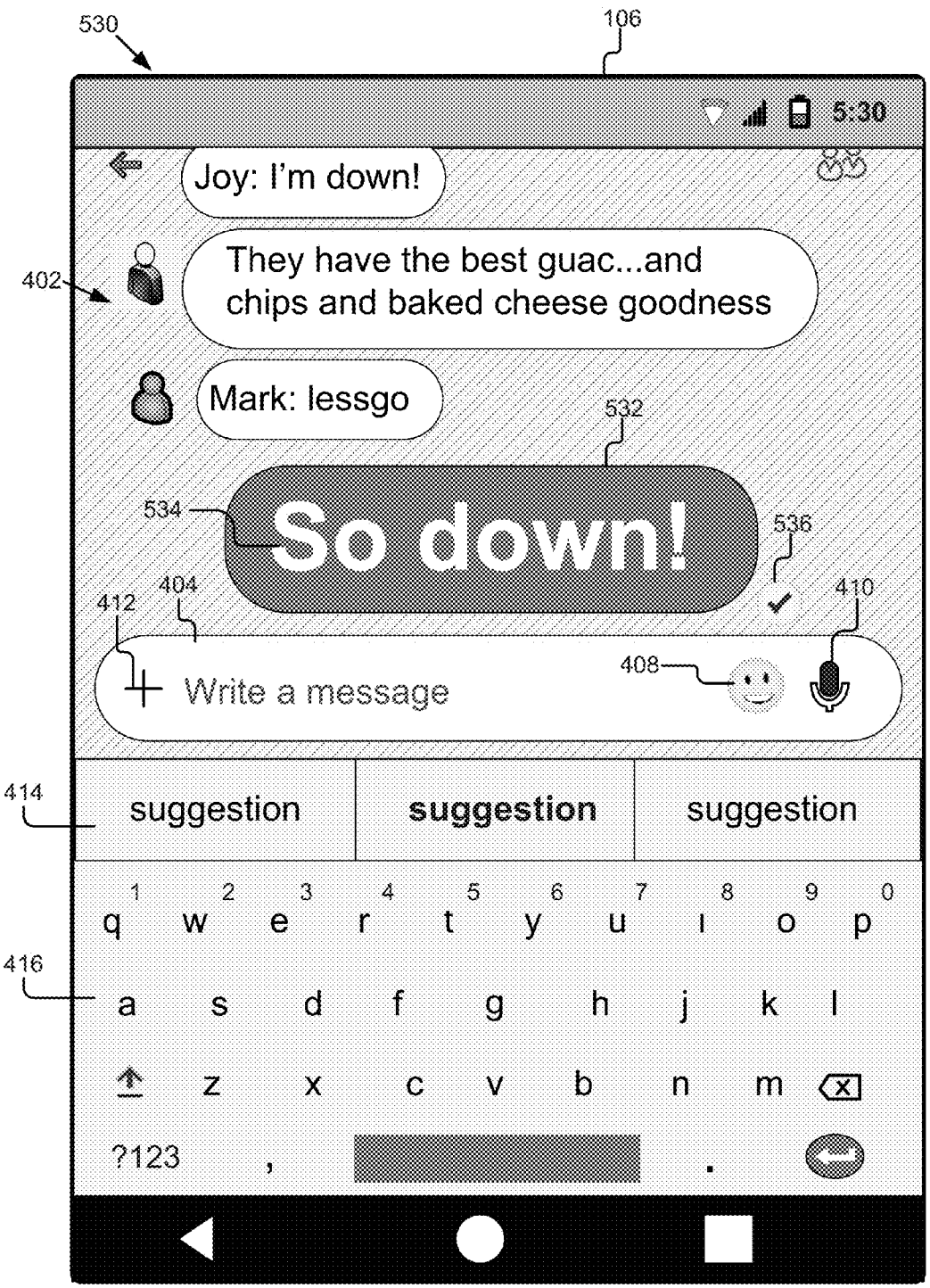
Figure 5E:
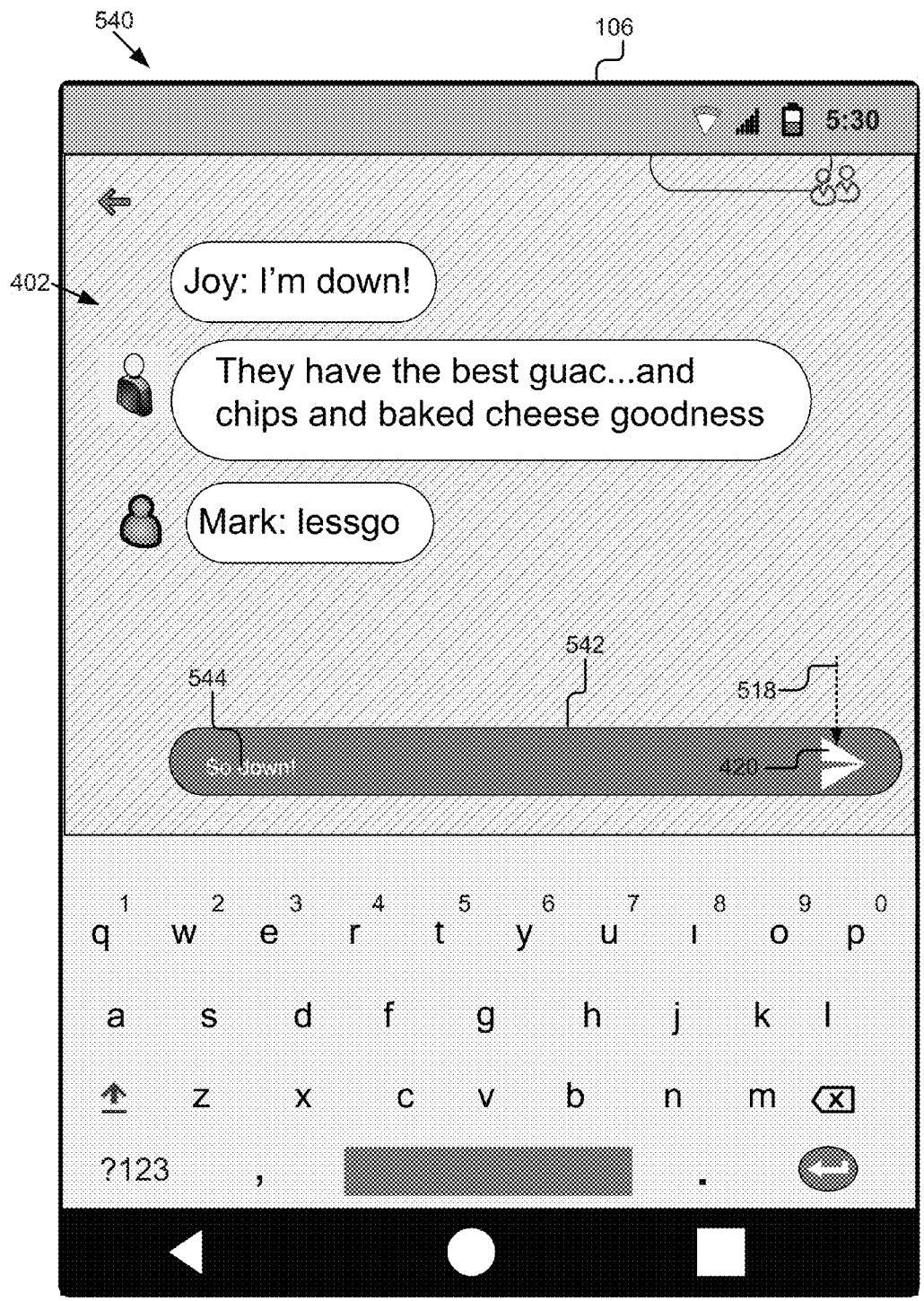

Once the user has selected the expressiveness control indicator 420, the interface transitions to that of FIG. 5B. The user interface 510 provides a content input region 512 that appears as a bubble in the conversation 402. The content input region 512 in some implementations has a different color that the content input region 404 of FIG. 4B. The input text "So down!" 514 in the content input region 512 is modified in expressiveness level in response to movement of the expressiveness control indicator 420 in a first direction 516 or a second direction 518. If the expressiveness control indicator 420 dragged in either the first direction 516 or the second direction 518, the content input region 512 is updated with the live preview of the level of expressiveness applied to the content. FIG. 5C shows the user interface 520 illustrating how the input text "So down!" 524 and the content input region 522 are modified in size when the expressiveness control indicator 420 in a first direction 516. FIG. 5D shows the user interface 530 illustrating how the sent message 532 with variable expressive text 534 is depicted when the user releases the expressiveness control indicator 420 and the message is sent. The send message 532 appears in the conversation 402 with size corresponding to the level of expressiveness with which it was sent and with a marker 536 proximate the message 532 to indicate it has been sent. Below the send message 532, the content input region 404 in its original form is again provided. FIG. 5E shows the user interface 540 illustrating how the text 544 and the content input region 542 are modified in size when the expressiveness control indicator 420 is moved in second first direction 518.

Figure 6A:
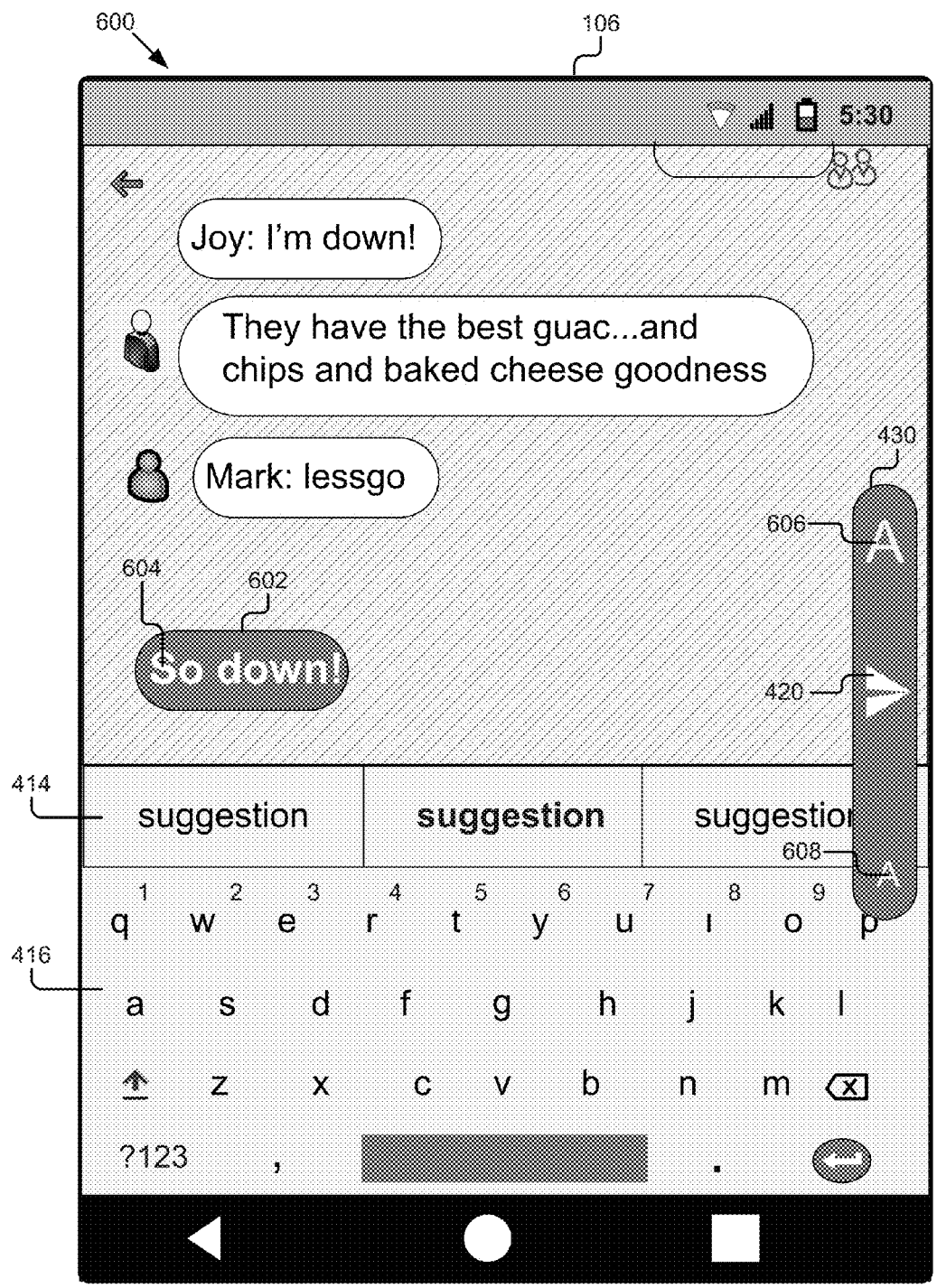
FIGS. 6A-6D are graphical representations of a third and fourth example user interface creating, sending, receiving or displaying messages with smart variable expressive text or graphics.
Figure 6B:
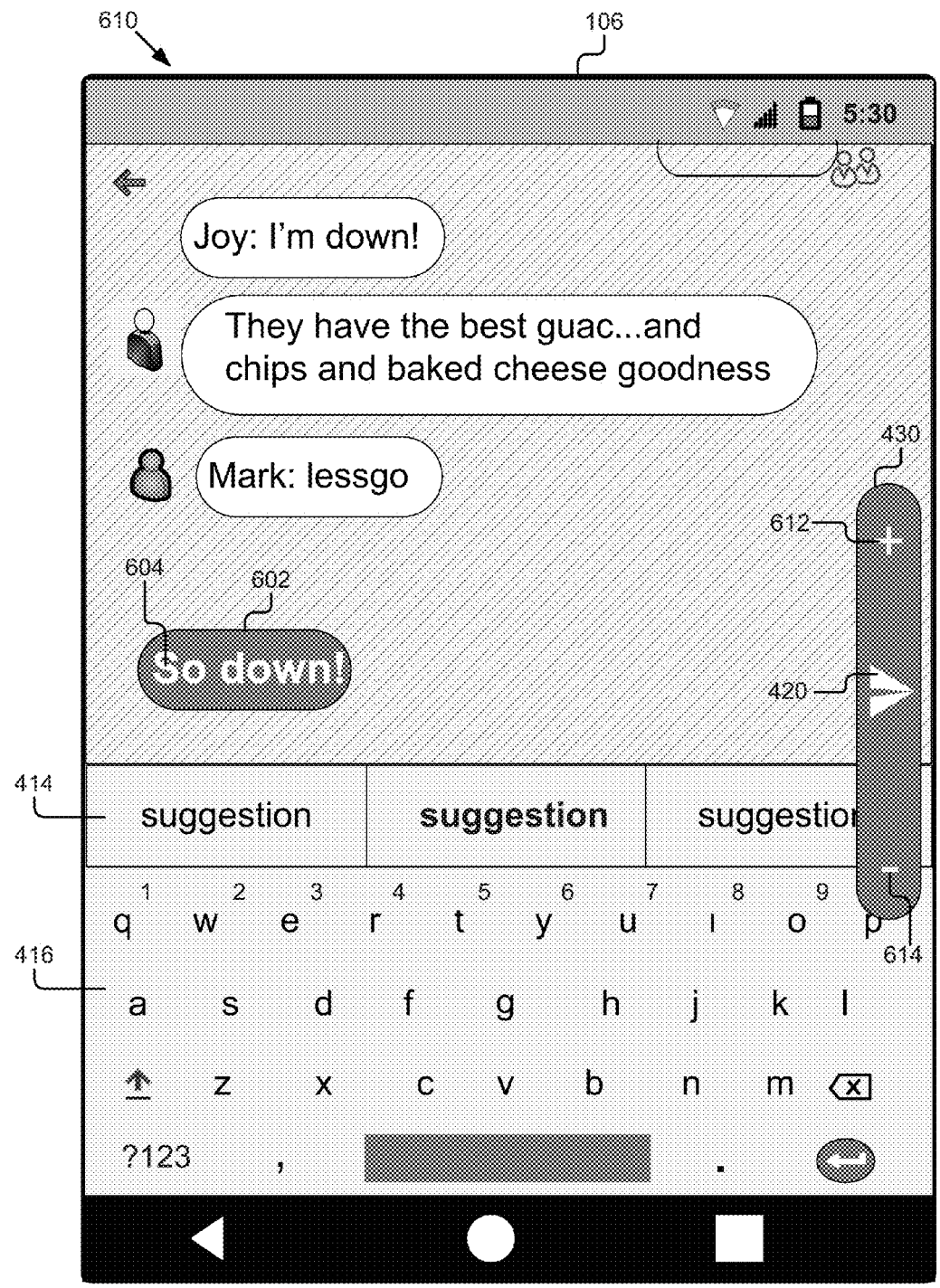
Figure 6C:
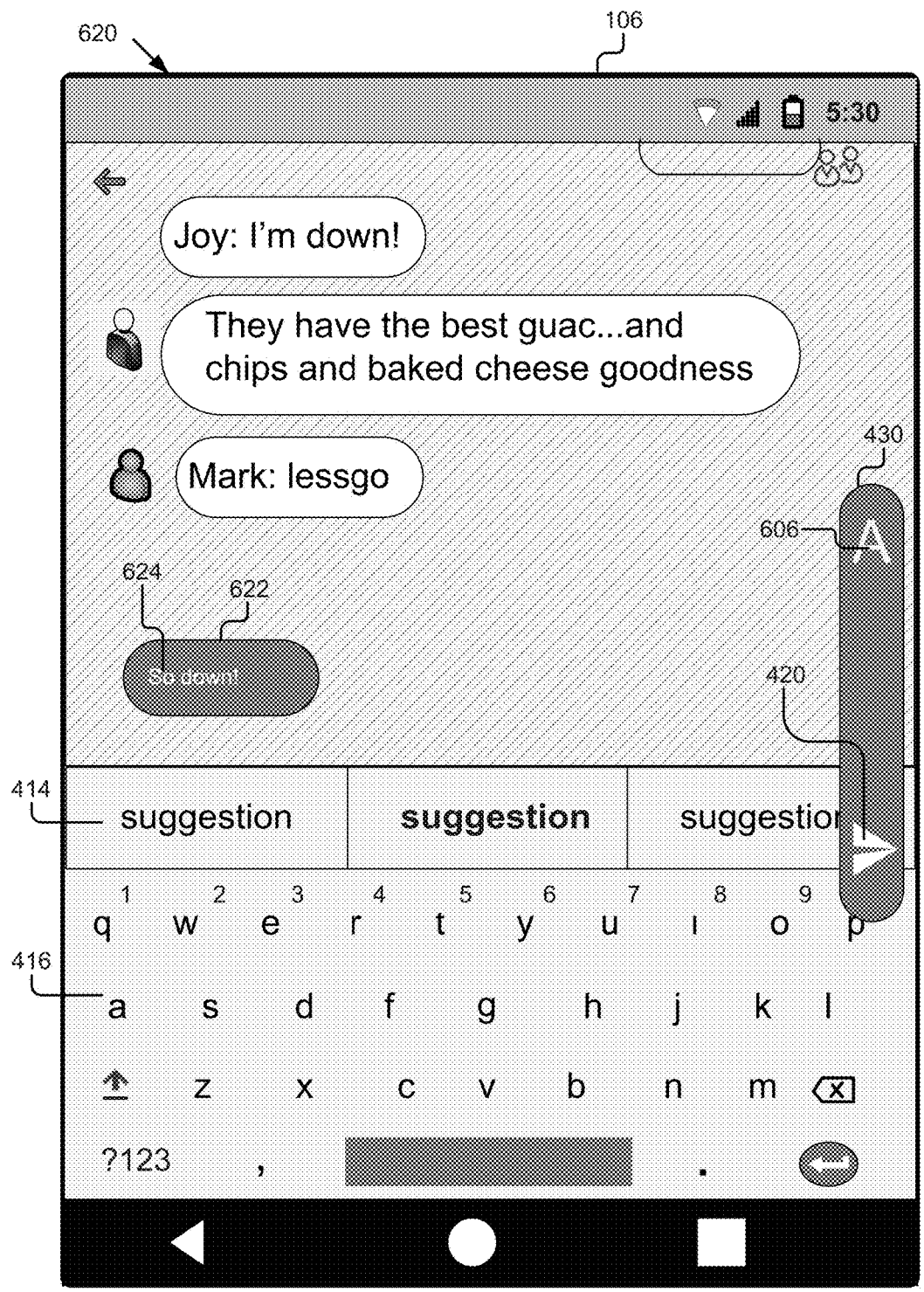
Figure 6D:
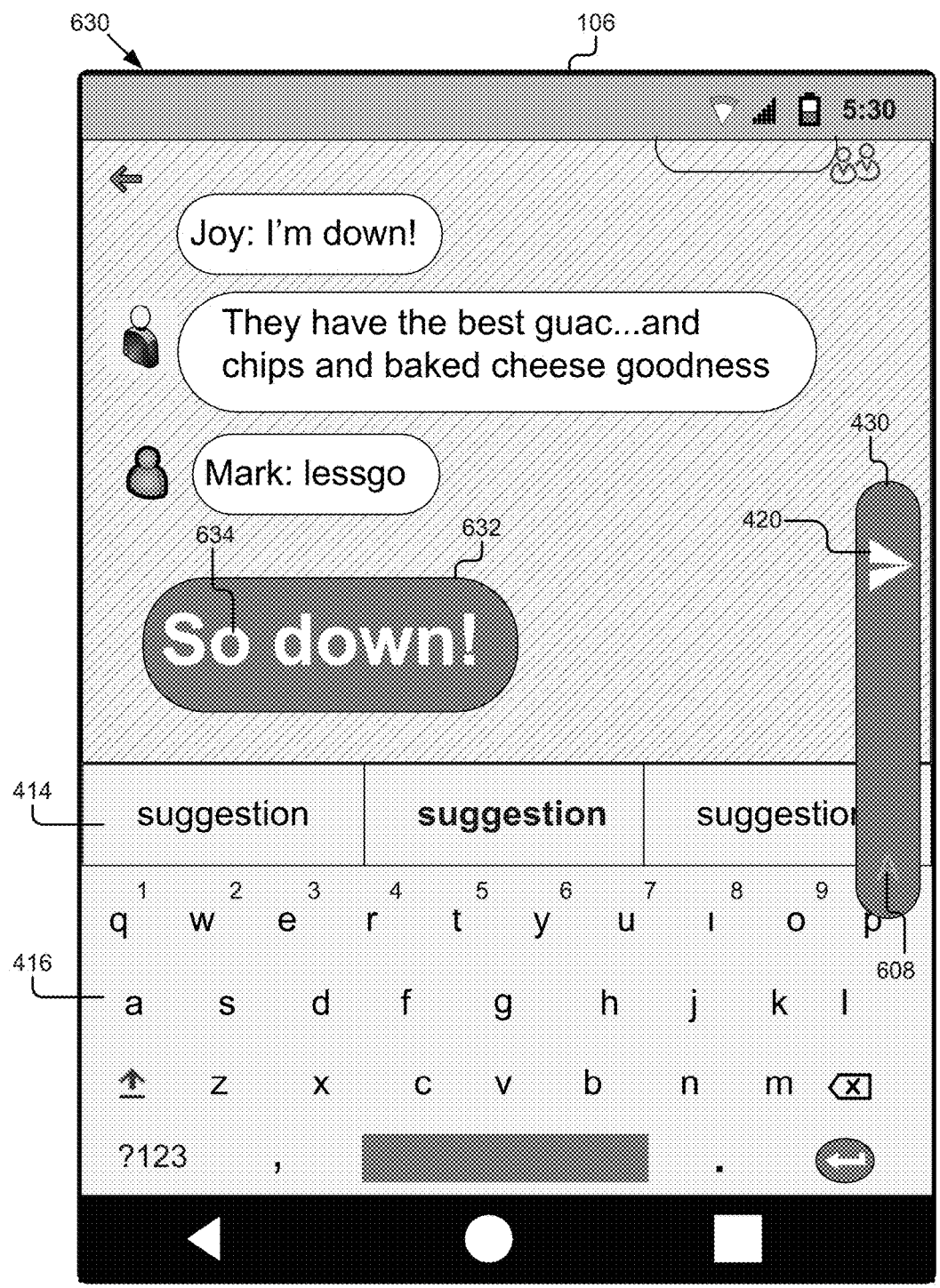

FIGS. 6A-6D are graphical representations of a third and fourth example user interface for creating and sending messages with smart variable expressive text or graphics. FIG. 6A shows another example interface 600 with attributes similar to FIG. 5B described above. The example interface 600 includes a slider bar 430 with scale hints 606, 608. The scale hints 606, 608 are the letter "A" sized as they will appear if the expressiveness control indicator 420 at the position of the scale hints 606, 608. The scale hints 606, 608 are positioned proximate opposite ends of the slider bar 430. Again, the user interfaces 600 provides a content input region 602 that appears as a bubble in the conversation 402. It should be understood that the input region 602 could take a variety of different shapes and appearances and that bubble is only used by way of example. The text 604 in the content input region 602 is modified in expressiveness level in response to movement of the expressiveness control indicator 420 toward either of the scale hints 606, 608. FIG. 6B shows another example user interface 610. In this example, the scale hints 612, 614 are a plus sign and minus sign, respectively, indicating whether the expressiveness level will be increased or decreased in response to movement of the expressiveness control indicator 420. FIG. 6C shows the user interface 620 illustrating how the text 624 and the content input region 622 are modified in size when the expressiveness control indicator 420 in a second direction 516, downward. FIG. 6D shows the user interface 630 illustrating how the text 634 and the content input region 632 are modified in size when the expressiveness control indicator 420 in a first direction 516, upward.

Figure 7A:
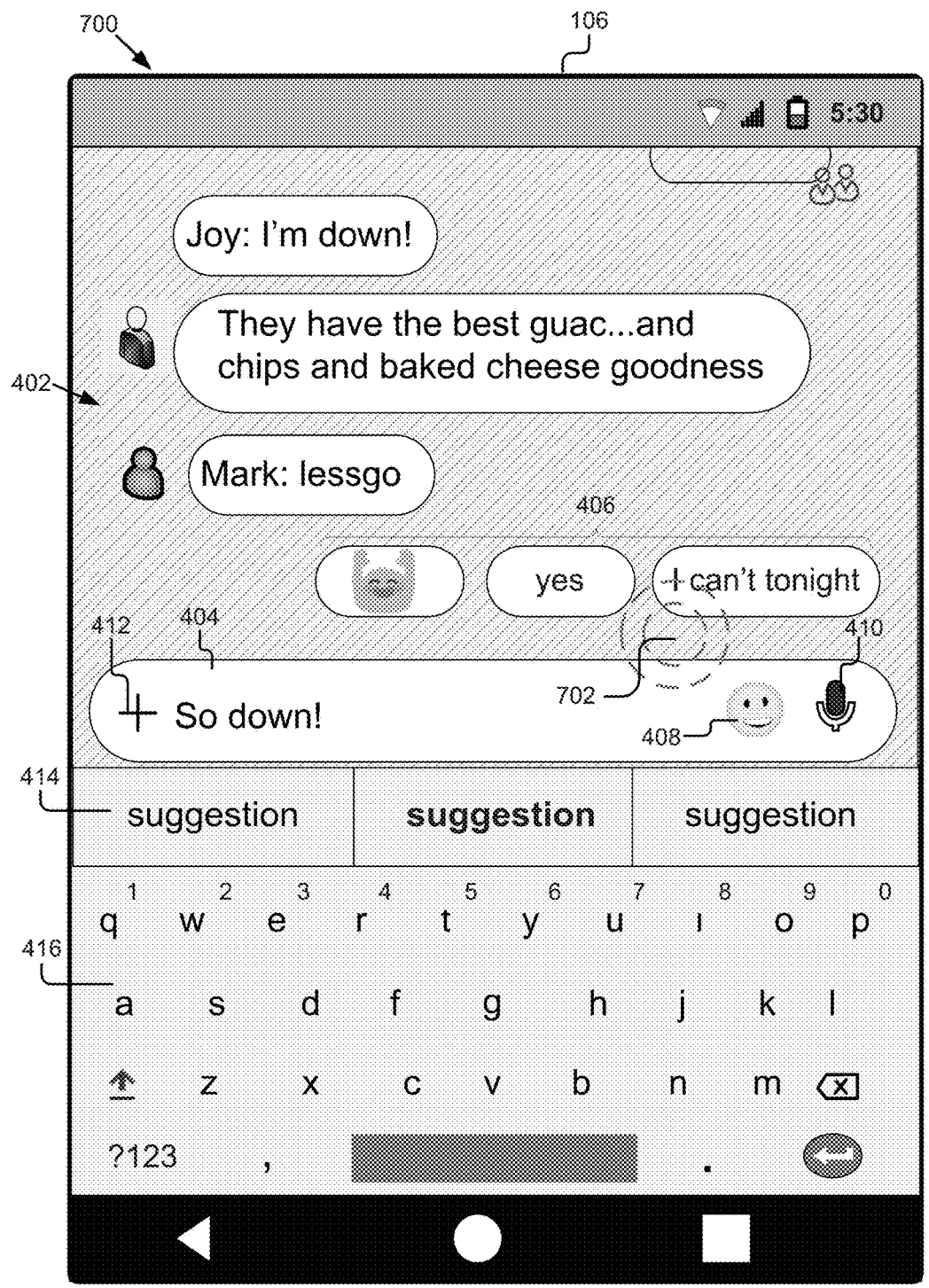
FIGS. 7A-7C are graphical representations of a fifth example user interface creating, sending, receiving or displaying messages with smart variable expressive text or graphics.
Figure 7B:
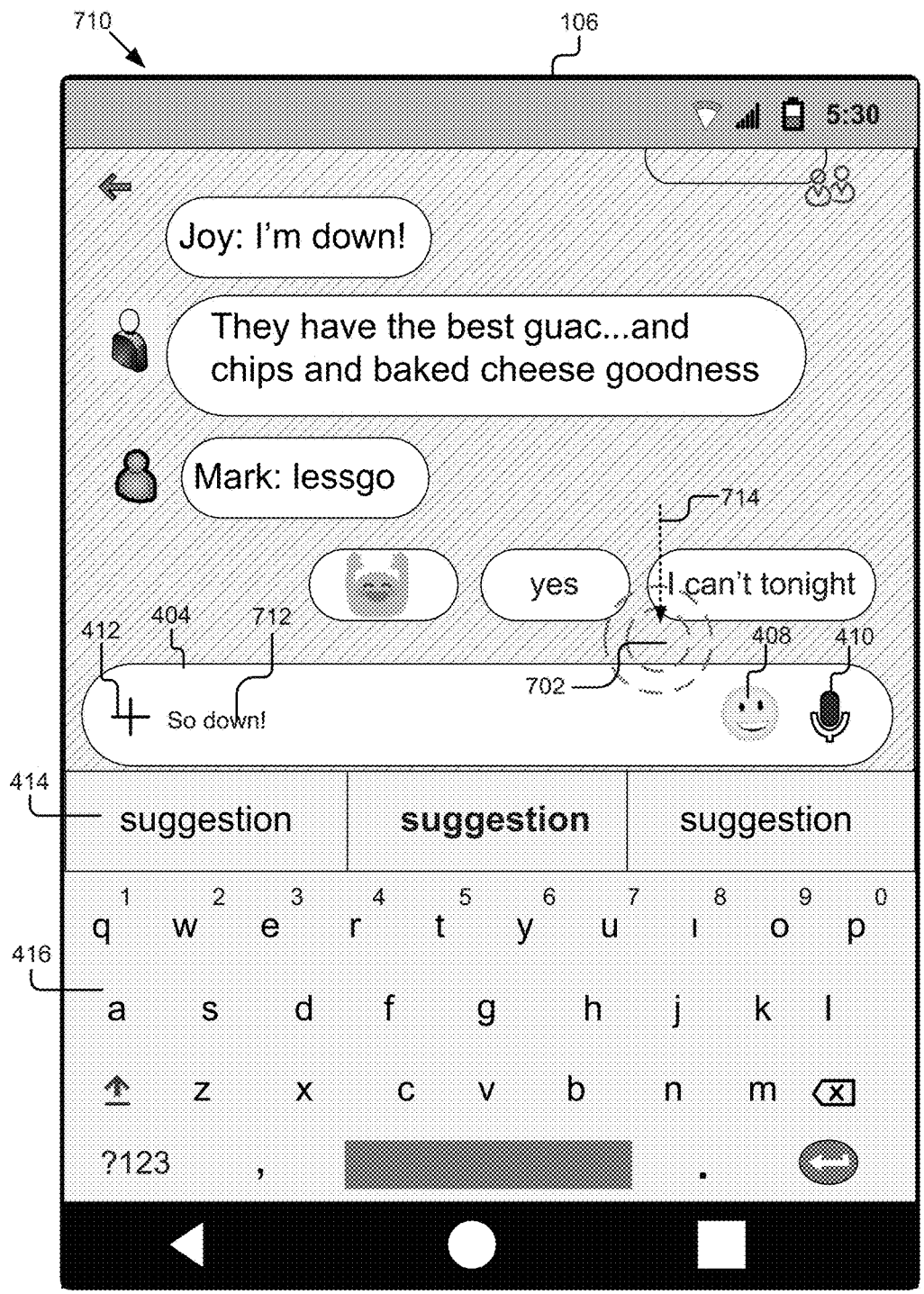
Figure 7C:
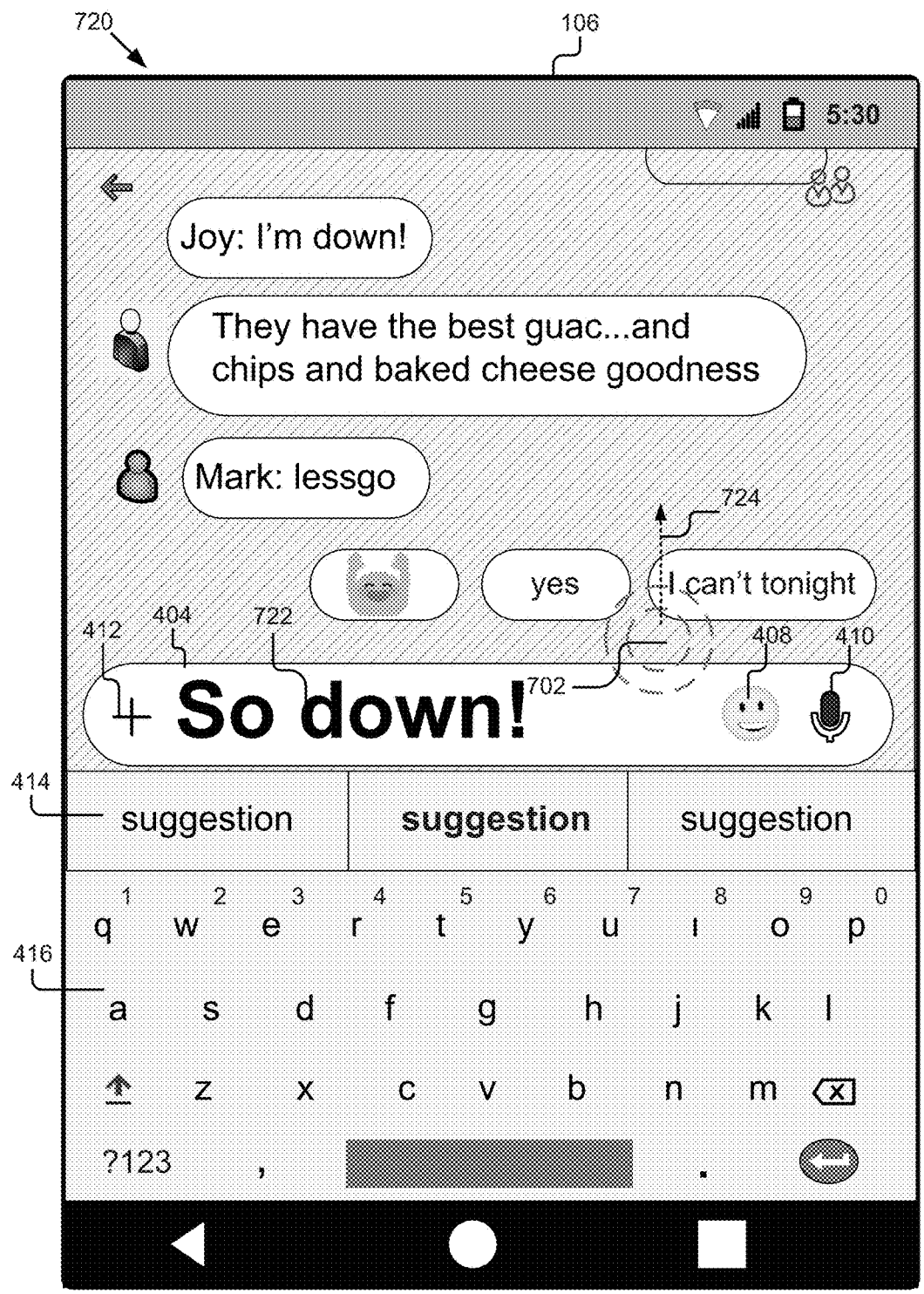

FIGS. 7A-7C are graphical representations of a fifth example user interface for creating and sending messages with smart variable expressive text or graphics. For convenience and ease of understanding like reference numerals are used in FIGS. 7A-7C to depict components of the user interface with similar functionality as that described above for FIGS. 4A-4J. The user interface 700 of FIG. 7A is similar to that of FIG. 4A. However, unlike FIG. 4B, FIG. 7A does not provide an expressiveness control indicator 420. Instead the user interface 700 provides a touch target 702 that is not visible as part of the user interface 700. The touch target is an area responsive to the user's touch and is represented in FIG. 7A by the concentric circles 702 shown with dashed lines. FIG. 7B shows the user interface 710 illustrating how the text 712 in the content input region 404 is modified in size when the touch target 702 is selected and dragged in a second direction 714, downward. FIG. 7C shows the user interface 720 illustrating how the text 722 in the content input region 404 is modified in size when the touch target 702 is dragged in a first direction 724, upward.

Figure 8A:
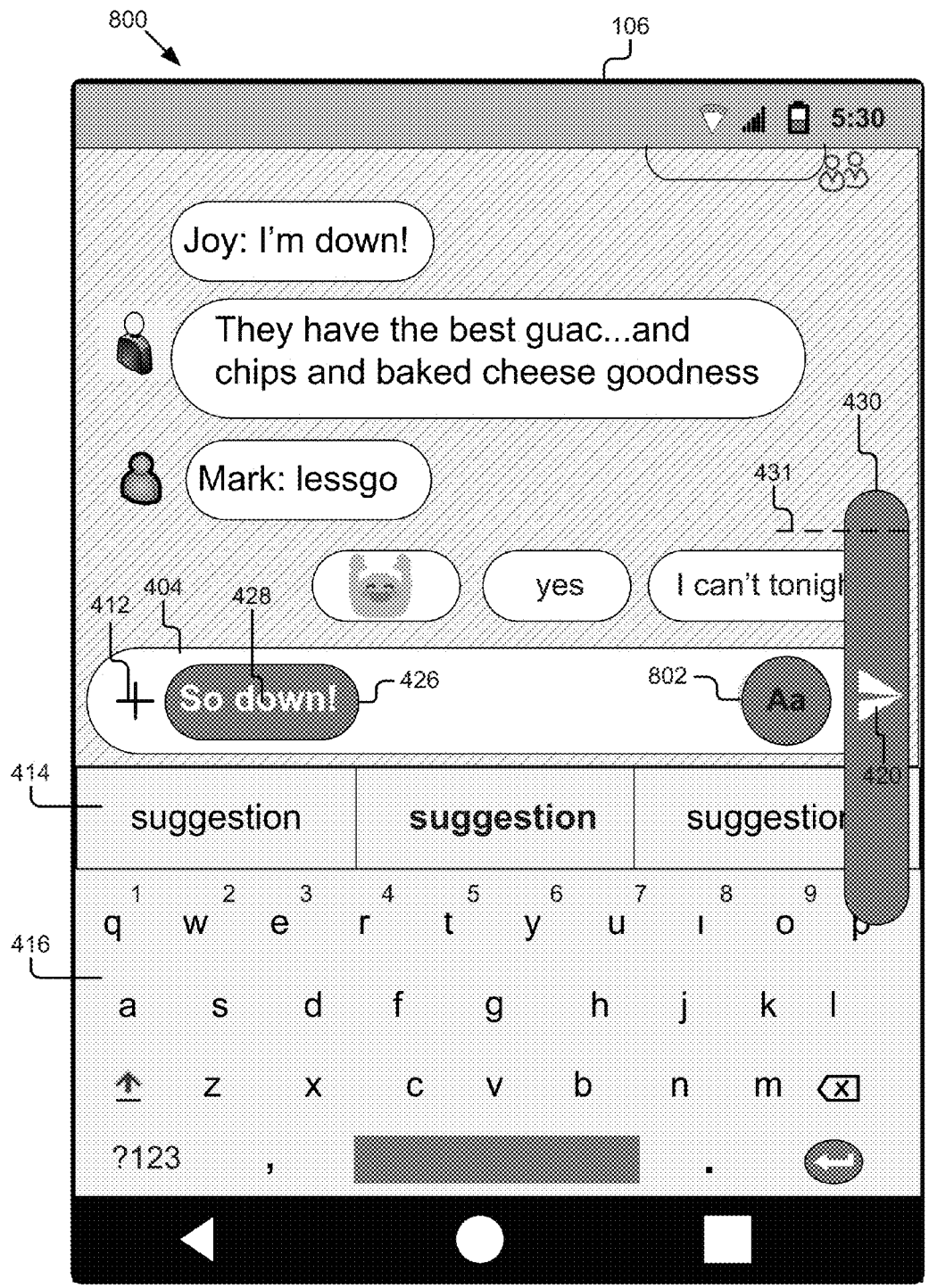
FIGS. 8A-8C are graphical representations of a sixth example user interface creating, sending, receiving or displaying messages with smart variable expressive text or graphics messages.
Figure 8B:
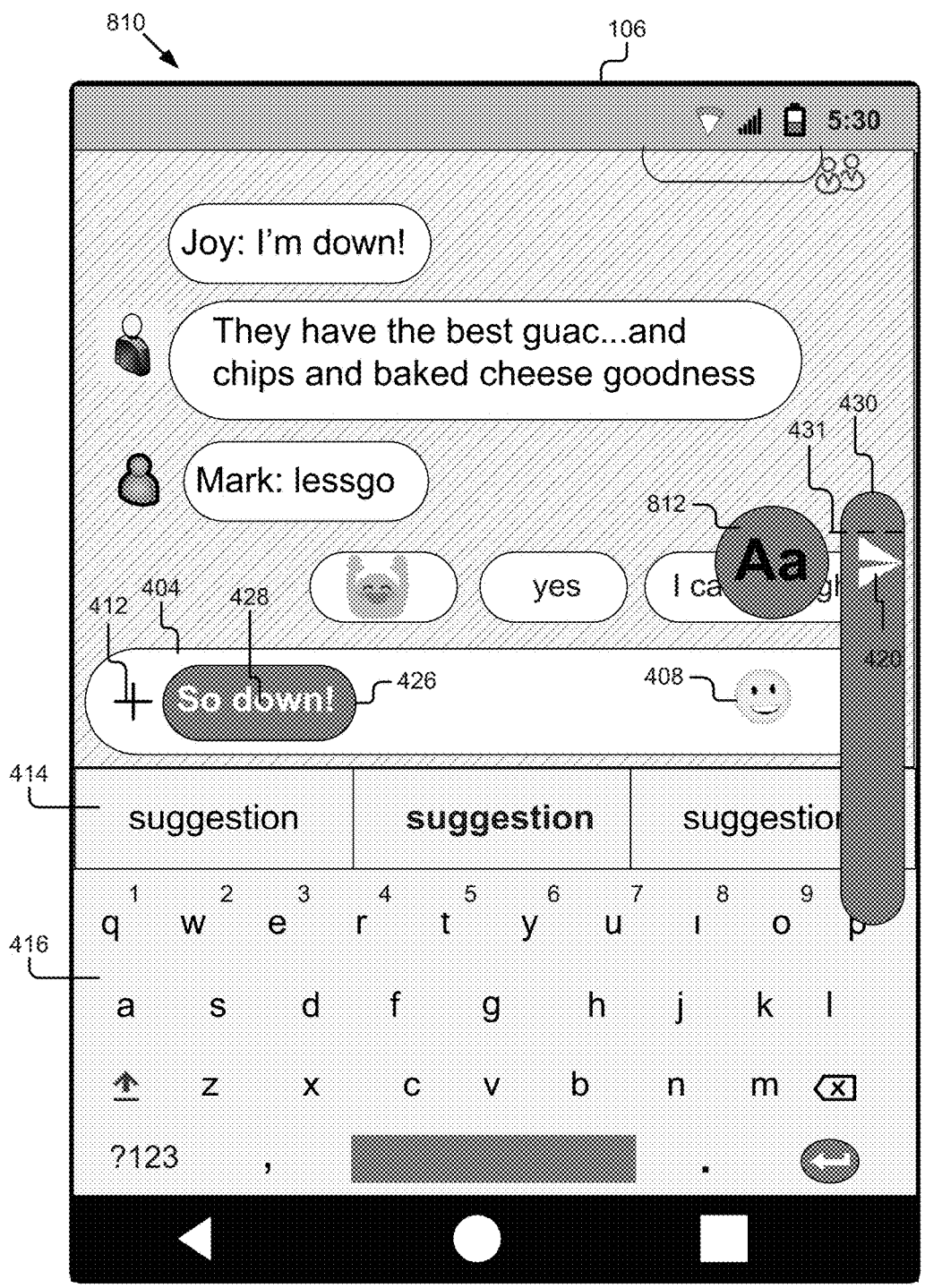
Figure 8C:
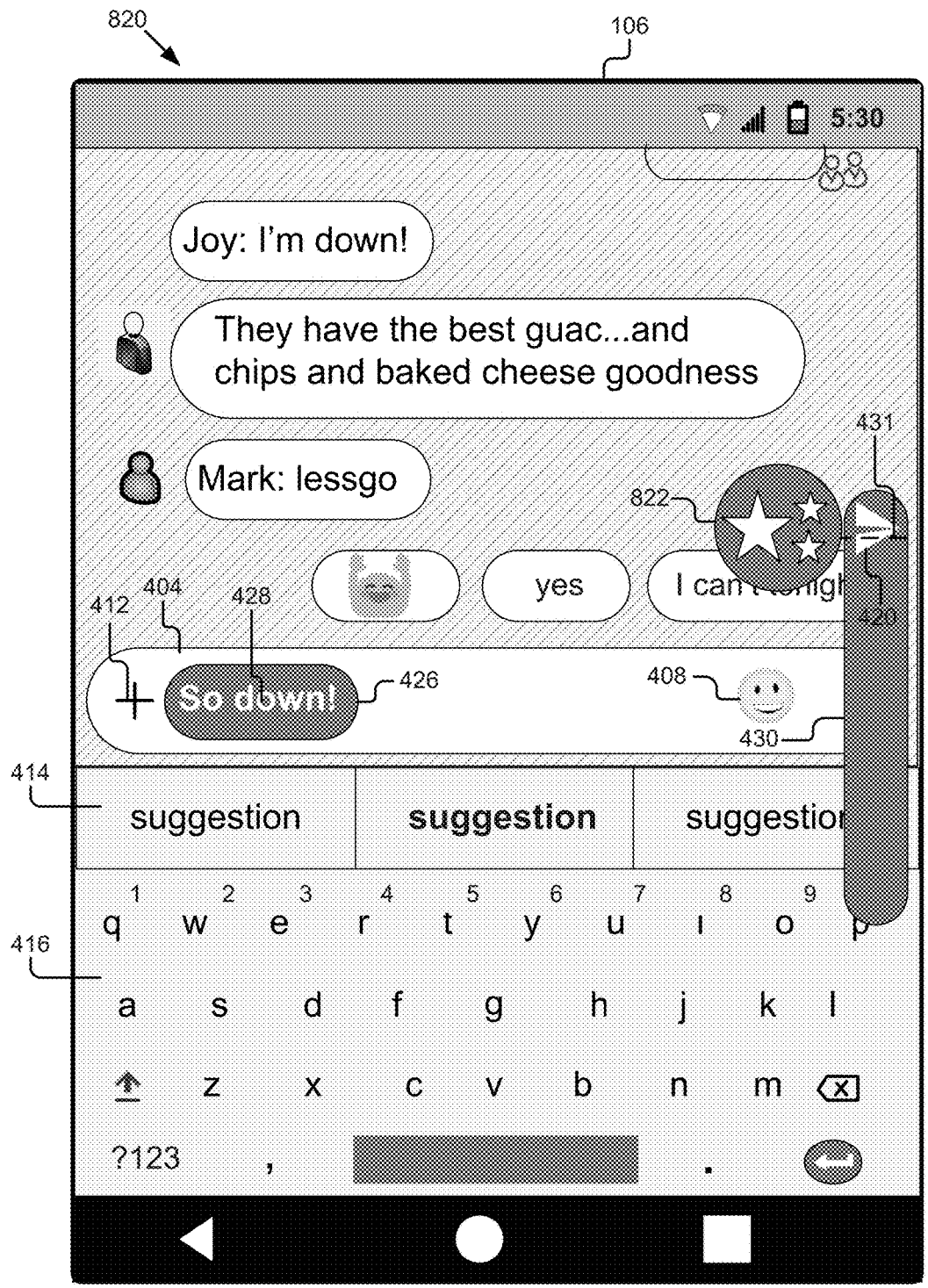

FIGS. 8A-8C are graphical representations of a sixth example user interface for creating and sending messages with smart variable expressive text or graphics messages. FIG. 8A depicts a user interface 800 similar to the user interface 424 of FIG. 4C. However, the user interface 800 also includes a visual marker 802 that is positioned horizontally in the user interface 800 at the same level as the expressiveness control indicator 420. Additionally, as can be seen by the comparing FIGS. 8A and 8B, the size of the visual marker 802, 812 varies to correspond to the level of expressiveness that is added to the content. For example, the visual clue 802, is the same size as the text 428 in the highlight area 426 where the visual clue 812 is much large indicating the approximate level of expressiveness that will be added to the text 428. Similarly although not shown the visual marker is reduced in sized as the expressiveness control indicator 420 is moved toward the bottom of the slider bar 430. In some implementations as shown in FIG. 8C, the visual clue 822 becomes a special symbol or as in this case a series of stars if the expressiveness control indicator 420 is moved beyond the threshold 431 indicating a substitute or surprise message will be sent.

The systems and methods discussed herein do not require collection or usage of user personal information. In situations in which certain implementations discussed herein may collect or use personal information about users (e.g., user data, information about a user's social network, user's location, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information only upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Reference in the specification to "some implementations" or "an implementation" means that a particular feature, structure, or characteristic described in connection with the implementation is included in at least some instances of the description. The appearances of the phrase "in some implementations" in various places in the specification are not necessarily all referring to the same implementation.

Some portions of the detailed description are presented in terms of processes and symbolic representations of operations on data bits within a computer memory. These symbolic descriptions and representations are the means used by those skilled in the data processing arts to most effectively convey the substance of their work to others skilled in the art. A process is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may include a general-purpose computer selectively activated or reconfigured by a computer program stored in the computer. Such a computer program may be stored in a non-transitory computer readable storage media, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware implementations, an entirely software implementation or implementations containing both hardware and software elements. In some implementations, the specification is implemented in software, which includes but is not limited to firmware, resident software, microcode, etc.

Furthermore, the description can take the form of a computer program product accessible from a computer-usable or computer-readable media providing program code for use by or in connection with a computer or any instruction execution system. For the purposes of this description, a computer-usable or computer readable media can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or social network data stores through intervening private or public networks. Modems, cable modem and Ethernet cards are just a few of the currently available types of network adapters.

Finally, the processes and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be implemented in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
providing, using one or more computing devices, a user interface operable to input content and specify an appearance of the content, wherein the user interface includes a slider bar, a moveable indicator disposed on the slider bar, and a visual cue indicating an amount of modification that will be applied to the appearance of the content based on a position of the indicator on the slider bar, the visual cue including one or more displayed objects that are separate from the content and that include the modification;
receiving, using the one or more computing devices, the content and an appearance control input via the user interface, wherein the indicator is moved by the appearance control input to set the amount of modification to the appearance of the content along a range of values corresponding to positions of the indicator on the slider bar;
responsive to the appearance control input, creating, using the one or more computing devices, a message including the content and formatting information, wherein the formatting information indicates the appearance of the content as modified by the appearance control input; and
sending, using the one or more computing devices, the message including the content and the formatting information to one or more other computing devices.

2. The computer-implemented method of claim 1, wherein the visual cue is positioned within or adjacent to one or more ends of the slider bar.

3. The computer-implemented method of claim 1, wherein the one or more displayed objects are displayed adjacent to the indicator, wherein the one or more displayed objects have a displayed size that varies to correspond to the position of the indicator on the slider bar.

4. The computer-implemented method of claim 3, wherein the one or more displayed objects include one or more text letters.

5. The computer-implemented method of claim 1, further comprising:
modifying, using the one or more computing devices, the appearance of the content responsive to the appearance control input; and
updating, using the one or more computing devices, the user interface to include the content with the modified appearance based on the appearance control input,
wherein the amount of modification to the appearance of the content includes an amount of modification to one or more of: size, color, shape, font, or animation.

6. The computer-implemented method of claim 1, wherein the content includes first text, and further comprising:
determining, using one or more computing devices, whether the appearance control input satisfies a threshold amount of modification, the threshold amount of modification provided at one or more threshold positions on the slider bar; and
responsive to the appearance control input satisfying the threshold amount of modification, replacing the first text of the content with second text that is different than the first text.

7. The computer-implemented method of claim 6, further comprising:
responsive to the appearance control input satisfying the threshold amount of modification, determining a context for the content; and
selecting the second text and an appearance of the second text based on the determined context.

8. The computer-implemented method of claim 7, wherein determining the context includes detecting one or more of: particular keywords in one or more previous messages, one or more recipients of the message, one or more applications used by a user, a current time, a current date, a location of at least one computing device of the one or more computing devices, weather at the location of the at least one computing device, a current event, or a current activity of the user.

9. The computer-implemented method of claim 6, further comprising displaying a threshold cue in the user interface in response to the indicator being moved by the appearance control input to one of the one or more threshold positions on the slider bar.

10. A computer program product comprising a non-transitory computer readable medium including a computer readable program, wherein the computer readable program when executed on a computer causes the computer to perform operations comprising:
providing a user interface operable to input content and specify an appearance of the content, wherein the user interface includes a slider bar, a moveable indicator disposed on the slider bar, and a visual cue indicating an amount of modification that will be applied to the appearance of the content based on a position of the indicator on the slider bar, the visual cue including one or more displayed objects that are separate from the content and that include the modification;
receiving the content and an appearance control input via the user interface, wherein the indicator is moved by the appearance control input to set the amount of modification to the appearance of the content along a range of values corresponding to positions of the indicator on the slider bar;
responsive to the appearance control input, creating a message including the content and formatting information, wherein the formatting information indicates the appearance of the content as modified by the appearance control input; and
sending the message including the content and the formatting information to one or more other computing devices.

11. The computer program product of claim 10, wherein the visual cue is positioned within or adjacent to one or more ends of the slider bar.

12. The computer program product of claim 10, wherein the one or more displayed objects are displayed adjacent to the indicator, wherein the one or more displayed objects have a displayed size that varies to correspond to the position of the indicator on the slider bar.

13. The computer program product of claim 10, wherein the one or more displayed objects include one or more text letters.

14. The computer program product of claim 10, wherein the operations further comprise:
modifying the appearance of the content responsive to the appearance control input; and
updating the user interface to include the content with the modified appearance based on the appearance control input,
wherein the amount of modification to the appearance of the content includes an amount of modification to one or more of: size, color, shape, font, or animation.

15. The computer program product of claim 10, wherein the content includes first text, wherein the operations further comprise:
determining whether the appearance control input satisfies a threshold amount of modification, the threshold amount of modification provided at one or more threshold positions on the slider bar; and
responsive to the appearance control input satisfying the threshold amount of modification, replacing the first text of the content with second text that is different than the first text.

16. The computer program product of claim 15, wherein the operations further comprise:
determining a context for the content, wherein the context is at least one of: a user context, a communication context, or a device context; and
selecting the second text and an appearance of the second text based on the determined context.

17. The computer program product of claim 16, wherein the operation of determining the context includes detecting one or more of: particular keywords in one or more previous messages, one or more recipients of the message, one or more applications used by a user, a current time, a current date, a location of at least one computing device of the one or more computing devices, weather at the location of the at least one computing device, a current event, or a current activity of the user.

18. The computer program product of claim 15, wherein the operations further comprise displaying a threshold cue in the user interface in response to the indicator being moved by the appearance control input to one of the one or more threshold positions on the slider bar.

19. A system comprising:
a processor; and
a memory storing instructions that, when executed, cause the system to perform operations comprising:
providing a user interface operable to input content and specify an appearance of the content, wherein the user interface includes a slider bar, a moveable indicator disposed on the slider bar, and a visual cue indicating an amount of modification that will be applied to the appearance of the content based on a position of the indicator on the slider bar, the visual cue including one or more displayed objects that are separate from the content and that include the modification;
receiving the content and an appearance control input via the user interface, wherein the indicator is moved by the appearance control input to set the amount of modification to the appearance of the content along a range of values corresponding to positions of the indicator on the slider bar;
responsive to the appearance control input, creating a message including the content and formatting information, wherein the formatting information indicates the appearance of the content as modified by the appearance control input; and
sending the message including the content and the formatting information to one or more other computing devices.

20. The system of claim 19, wherein the visual cue is positioned within or adjacent to one or more ends of the slider bar.

21. The system of claim 19, wherein the one or more displayed objects are displayed adjacent to the indicator, wherein the one or more displayed objects have a displayed size that varies to correspond to the position of the indicator on the slider bar.

22. The system of claim 19, wherein the one or more displayed objects include one or more text letters.

23. The system of claim 19, wherein the operations further comprise:
modifying the appearance of the content responsive to the appearance control input; and
updating the user interface to include the content with the modified appearance based on the appearance control input.

24. The system of claim 19, wherein the content includes first text, wherein the operations further comprise:
determining whether the appearance control input satisfies a threshold amount of modification, the threshold amount of modification provided at one or more threshold positions on the slider bar; and
responsive to the appearance control input satisfying the threshold amount of modification, replacing the first text of the content with second text that is different than the first text.

25. The system of claim 24, wherein the operations further comprise:
determining a context for the content, wherein the context is at least one of: a user context, a communication context, or a device context; and
selecting the second text and an appearance of the second text based on the determined context.

26. The system of claim 25, wherein the operation of determining the context includes detecting one or more of: particular keywords in one or more previous messages, one or more recipients of the message, one or more applications used by a user, a current time, a current date, a location of at least one computing device of the one or more computing devices, weather at the location of the at least one computing device, a current event, or a current activity of the user.

27. The system of claim 24, wherein the operations further comprise displaying a threshold cue in the user interface in response to the indicator being moved by the appearance control input to one of the one or more threshold positions on the slider bar.

* * * * *